(12) United States Patent
Fukuyama et al.

(10) Patent No.: US 7,782,528 B2
(45) Date of Patent: Aug. 24, 2010

(54) MICROSCOPE EXAMINATION APPARATUS

(75) Inventors: Hiroya Fukuyama, Machida (JP);
Yoshihisa Tanikawa, Chuo-ku (JP);
Tadashi Hirata, Hachioji (JP); Seiya Takahashi, Saitama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/435,600

(22) Filed: May 5, 2009

(65) Prior Publication Data
US 2009/0231422 A1 Sep. 17, 2009

Related U.S. Application Data

(63) Continuation of application No. 11/923,138, filed on Oct. 24, 2007, now abandoned, which is a continuation of application No. 11/651,552, filed on Jan. 10, 2007, now abandoned.

(30) Foreign Application Priority Data

Jan. 12, 2006  (JP) ............................. 2006-004881
Mar. 1, 2006   (JP) ............................. 2006-055060

(51) Int. Cl.
*G02B 21/36* (2006.01)

(52) U.S. Cl. .................. 359/363; 382/255; 396/153

(58) Field of Classification Search .................. None
See application file for complete search history.

(56) References Cited

U.S. PATENT DOCUMENTS 4,810,869 A    3/1989   Yabe et al.
7,324,274 B2   1/2008   Komatsu et al.
2001/0010592 A1  8/2001  Nakamura
2004/0092828 A1  5/2004  Hoppe et al.
2005/0007660 A1  1/2005  Denk
2005/0237604 A1 10/2005  Kawano

FOREIGN PATENT DOCUMENTS

| JP | 07-222754   | 8/1995  |
| JP | 2001/305420 | 10/2001 |
| JP | 2001-319350 | 11/2001 |
| JP | 2004-213801 | 7/2004  |
| WO | WO 9704348  | 2/1997  |

OTHER PUBLICATIONS

European Search Report dated Sep. 2, 2009.

*Primary Examiner*—Stephone B Allen
*Assistant Examiner*—Derek S Chapel
(74) *Attorney, Agent, or Firm*—Pillsbury Winthrop Shaw Pittman, LLP

(57) ABSTRACT

A microscope examination apparatus including a light source; an illumination optical system configured to guide light from the light source to a specimen; an objective lens configured to collimate return light from the specimen, the objective lens being provided in such a manner as to be displaceable at least in a direction intersecting an optical axis of the objective lens; an image-forming lens configured to image the return light from the specimen, which is collimated by the objective lens; an optical detector configured to detect the return light imaged by the image-forming lens; a microscope main body including the image-forming lens and the optical detector; and an objective-lens driving mechanism configured to drive the objective lens in a direction correcting image blur due to a displacement of the specimen.

11 Claims, 27 Drawing Sheets

| MOTION OF OBJECTIVE LENS | CONDUCTING COIL | | | | UP AND DOWN DRIVING DIRECTIONS |
|---|---|---|---|---|---|
| | TOP | | BOTTOM | | |
| | OUTER | INNER | OUTER | INNER | |
| x | O | — | O | — | IN PHASE |
| y | — | O | — | O | IN PHASE |
| A | — | O | — | O | OPPOSITE PHASE |
| B | O | — | O | — | OPPOSITE PHASE |

MICROSCOPE EXAMINATION APPARATUS

CROSS-REFERENCE TO RELATED APPLICATIONS

This application is a continuation of U.S. application Ser. No. 11/923,138, filed Oct. 24, 2007, now abandoned which is a continuation of U.S. application Ser. No. 11/651,552, filed Jan. 10, 2007, now abandoned, and for which priority is claimed under 35 U.S.C. §120. This application is based upon and claims the benefit of priority under 35 U.S.C. §119 from the prior Japanese Patent Application Nos., 2006-004881 filed Jan. 12, 2006 and No. 2006-055060, filed Mar. 1, 2006. The entire contents of all applications are incorporated herein by reference in their entireties.

BACKGROUND OF THE INVENTION

1. Field of the Invention

The present invention relates to a microscope examination apparatus, a method of securing a specimen, a securing apparatus, and a stage apparatus.

2. Description of Related Art

Recently, in biological research, ion concentration, membrane potential, and so on have been visualized with fluorescence probes using optical microscopes. For example, using individual laboratory animals as specimens, so-called in vivo examination is carried out to observe internal organs and so on while the animal is still alive.

One known apparatus including an image-acquisition means, is made to track the motion of the examination site (for example, see Japanese Unexamined Patent Application, Publication No. HEI-7-222754 (hereinafter referred to as Document 1)).

However, with the apparatus disclosed in Document 1, it is necessary to drive the entire microscope, which has a high weight. Therefore, this apparatus has the problem that it cannot be moved at high speed. For example, when observing a heart, because the pulse rate of a rat is about 350 beats per minute and the pulse rate of a mouse is about 620 beats per minute, it is extremely difficult to make the apparatus in Document 1 track these pulse rates.

BRIEF SUMMARY OF THE INVENTION

It is an object of the present invention to provide a microscope examination apparatus, a specimen securing method and securing apparatus, and a stage apparatus which can obtain clear images from a living organism that exhibits dynamic behavior and moves within a particularly short period of time.

A first aspect of the present invention is a microscope examination apparatus comprising a light source; an illumination optical system configured to guide light from the light source to a specimen; an objective lens configured to collimate return light from the specimen, the objective lens being provided in such a manner as to be displaceable at least in a direction intersecting an optical axis of the objective lens; an image-forming lens configured to image the return light from the specimen, which is collimated by the objective lens; an optical detector configured to detect the return light imaged by the image-forming lens; a microscope main body including the image-forming lens and the optical detector; and an objective-lens driving mechanism configured to drive the objective lens in a direction correcting image blur due to a displacement of the specimen.

With the microscope examination apparatus described above, the objective-lens driving mechanism is operated to drive the objective lens, in a direction correcting image blur, relative to the specimen in which shifting occurs at the examination site due to dynamic motion of the specimen. By displacing only the objective lens while keeping the microscope main body, which includes the light source, the image-forming lens, and so forth, fixed, it is possible to suppress the motion of the specimen, such as a living organism which exhibits motion with a particularly short time period. Therefore, image blur can be corrected, and it is thus possible to acquire clear images.

In the microscope examination apparatus described above, the objective lens may be provided so as to be capable of parallel motion in a direction intersecting the optical axis thereof.

With this configuration, even if the specimen moves in a direction intersecting the optical axis of the objective lens, by operating the objective-lens driving mechanism, it is possible to move the objective lens so that it tracks the displacement of the specimen. As a result, it is possible to correct for shifting of the examination site, and therefore, clear, blur-free images can be acquired.

In the microscope examination apparatus described above, the objective lens may be provided so as to be capable of rotating about an axis intersecting the optical axis.

With this configuration, even if the inclination of the observation plane changes due to displacement of the specimen about an axis intersecting the objective lens, by operating the objective-lens driving mechanism, it is possible to move the objective lens so that the optical axis of the objective lens is substantially orthogonal to the observation plane. Therefore, so called blur and so forth can be prevented, and it is thus possible to acquire clear images.

In the microscope examination apparatus described above, the objective lens may provided so as to be capable of rotating about a principal point of the objective lens.

With this configuration, it is possible to tilt the optical axis of the objective lens while maintaining a conjugate condition between the observation plane and the detection plane of the optical detector. As a result, it is possible to prevent blur. Furthermore, the rotation of the objective lens about the principal point has no effect on the image position. Therefore, it is possible to prevent image blur.

In the microscope examination apparatus described above, the objective lens may be provided so as to be capable of rotating about an object point of the objective lens.

With this configuration, it is possible to tilt the optical axis of the objective lens while maintaining a conjugate condition between the observation plane and the detection plane of the optical detector. As a result, it is possible to prevent blur. Furthermore, by rotating the objective lens about the object point, it is possible to always observe the center of the specimen at an on-axis region of the objective lens, which allows observation without degrading the optical characteristics of the objective lens. Therefore, it is possible to prevent the aberrations due to rotation of the objective lens from worsening.

The microscope examination apparatus described above preferably further comprises a correction optical system for correcting shifting of the optical axis by rotating the objective lens. When the objective lens is rotated about the object point thereof, it is possible to always observe the center of the specimen at the on-axis region of the objective lens. Because image blur occurs at the detection plane of the optical detector, it is possible to acquire blur-free images by correcting the image blur by operating the correction optical system.

In the microscope examination apparatus described above, the light source and the illumination optical system may be provided within the main body.

In the microscope examination apparatus described above, the specimen may include a small laboratory animal.

A second aspect of the present invention is a specimen securing method for securing a specimen, which is mounted on a stage, to the stage by pressing the specimen to the stage with a tensile force of a sheet member covering the specimen.

With this specimen securing method, the specimen mounted on the stage is secured by being pressed to the stage by the tensile force of the sheet member. Because the sheet member has a large area, a large pressing force is not applied locally to the specimen. Therefore, the effect on the specimen can be reduced and the viability of the specimen can thus be maintained. By securing the specimen using the sheet member with a large area, it is possible to suppress the periodic motion of the entire specimen. As a result, blurring of the observed image due to such motion can be prevented, and it is thus possible to acquire clear images.

In the specimen securing method described above, the sheet member may be a strip partially covering the specimen.

With this configuration, because the motion is suppressed by the strip-shaped sheet member, it is possible to partially suppress the effective site.

In the aspect of the invention described above, the sheet member may entirely cover the specimen.

In the specimen securing method described above, the sheet member may be transparent.

With this configuration it is possible to observe the examination site of the specimen via the sheet member which secures the specimen. As a results, it is possible to observe the examination site while directly securing the specimen with the sheet member, and blurring of the observed images can thus be suppressed effectively.

In the specimen securing method described above, a through-hole may be provided in the sheet member covering the specimen at a position corresponding to an examination site of the specimen.

With this configuration, it is possible to directly observe the specimen by exposing the examination site through the through-hole in the sheet member which secures the specimen. Therefore, the sheet member is not restricted to a transparent material, and it is possible to use any suitable material.

A third aspect of the present invention is a specimen securing apparatus comprising a frame having a size that surrounds a specimen mounted on a stage; a sheet member stretched at an inner side of the frame; and a pressing portion configured to press the frame towards the stage.

With this specimen securing apparatus, the sheet member which is stretched inside the frame is pressed from above onto the specimen mounted on the stage, and the frame is pressed towards the stage by the pressing portion, while the specimen is sandwiched between the stage and the sheet member. By doing so, the tensile force of the sheet member is increased, and it is thus possible to secure the specimen.

In the specimen securing apparatus described above, the frame may include a pair of frame plates sandwiching the sheet member, and a joining portion configured to join the frame plates in a detachable manner.

With this configuration, by sandwiching the sheet member between the pair of frame-shaped plates and joining the two frame-shaped plates using the joining portion, it is possible to integrate the frame and the sheet member. Also, by unjoining the frame-shaped plates joined by the joining portion, it is possible to separate the sheet member and the frame. Therefore, it is possible to easily replace the sheet member.

In the specimen securing apparatus described above, the joining portion is constituted by forming one of the frame plates of a magnet and forming the other one of a magnet or a magnetic material.

With this configuration, it is possible to easily integrate the sheet member and the frame by joining the pair of frame-shaped plates using the magnetic force of attraction of a magnet. Also, by applying the force that surpasses the magnetic force of attraction of the magnet to separate the frame-shaped plates, it is possible to easily separate the sheet member from the frame.

In the specimen securing apparatus described above, the sheet member may be transparent.

In the specimen securing apparatus described above, a through-hole may be provided in the sheet member covering the specimen, at a position corresponding to an examination site of the specimen.

A fourth aspect of the present invention is a stage apparatus comprising a stage configured to mount a specimen, and any one of the specimen securing apparatuses described above.

With this stage apparatus, by operating the specimen securing apparatus to press the frame towards the stage, the specimen is sandwiched between the stage and the sheet member supported in the frame. It is thus possible to effectively and easily secure the specimen using the tensile force of the sheet member.

According to the present invention, an advantage is afforded in that it is possible to acquire clear images from a living organism that exhibits dynamic motion, particularly movement within a short period of time. In addition, the present invention provides an advantage in that it is possible to continuously or consecutively acquire images without going out of the field of view of a living organism that moves with a large amplitude.

DETAILED DESCRIPTION OF THE INVENTION

A microscope examination apparatus 1 according to a first embodiment of the present invention will be described below with reference to FIGS. 1 to 10.

Figure 1:
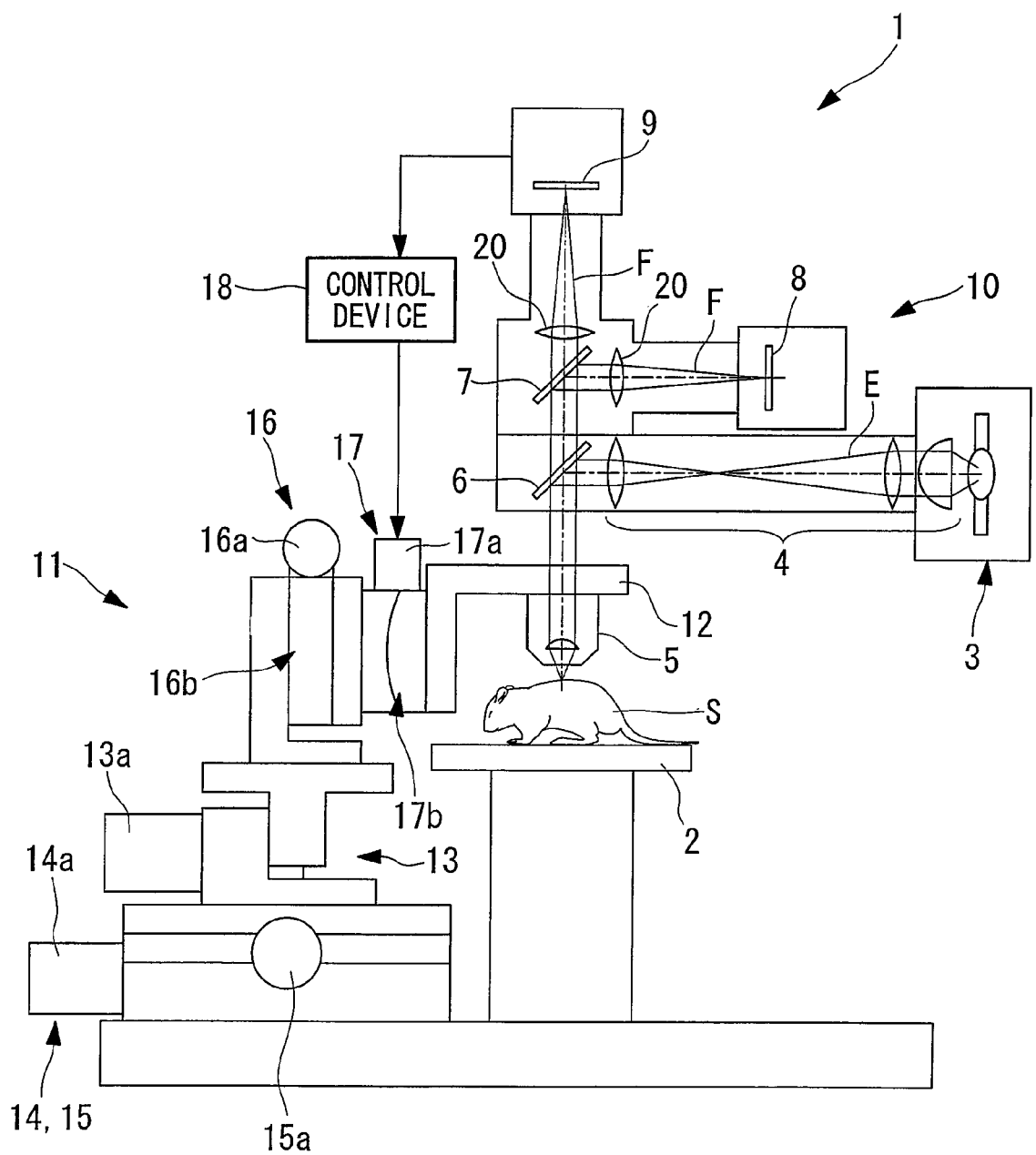
FIG. 1 is a diagram showing the overall configuration of a microscope examination apparatus according to a first embodiment of the present invention.

As shown in FIG. 1, the microscope examination apparatus 1 according to this embodiment includes a stage 2 for mounting a specimen S; an excitation light source 3 for emitting excitation light E; an illumination lens (illumination optical system) 4 for guiding the excitation light E from the excitation light source 3; an objective lens 5 for guiding the excitation light E guided by the illumination lens 4 to the specimen S, as well as for collimating fluorescence F generated in the specimen S; a dichroic mirror 6 for splitting off from the excitation light E the fluorescence F collimated by the objective lens 5; a beamsplitter 7 for further dividing the split-off fluorescence F; and two image-acquisition devices (optical detectors) 8 and 9, such as CCDs, for detecting the split-off fluorescence F. Reference numerals 20 in this figure are image-forming lenses.

The excitation light source 3, the illumination lens 4, the dichroic mirror 6, the beamsplitter 7, and the two image-acquisition devices 8 and 9 are provided in a microscope main body 10. On the other hand, the objective lens 5 is separate from the microscope main body 10, and is supported by an objective-lens driving mechanism 11.

Figure 2:
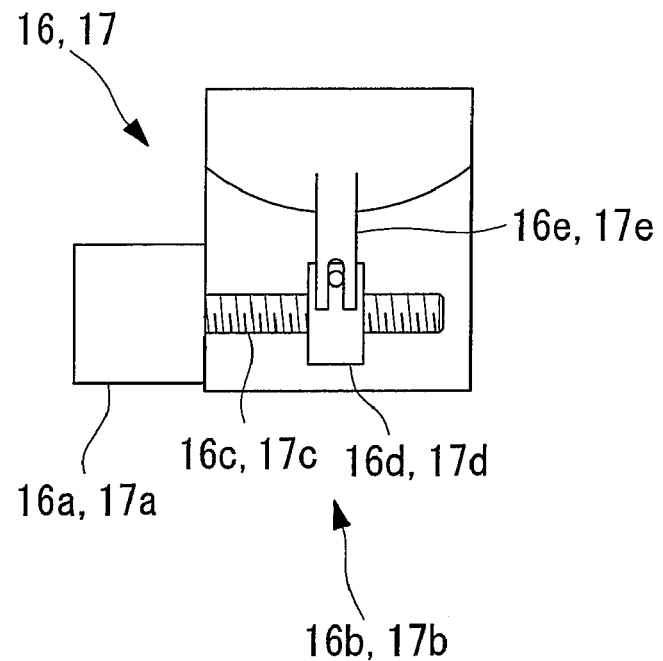
FIGS. 2 and 3 are diagrams showing examples of a driving mechanism for driving an objective lens in an objective-lens driving mechanism of the microscope examination apparatus in FIG. 1.
Figure 3:
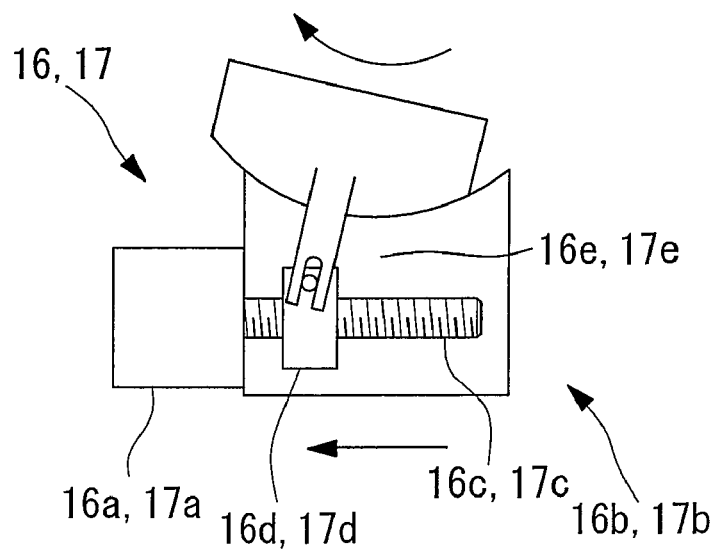
Figure 4:
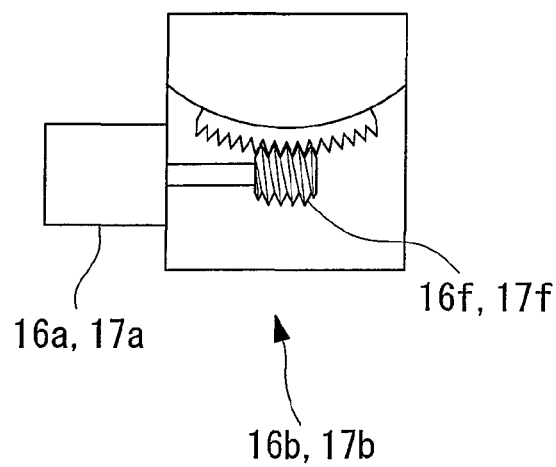
FIG. 4 is a diagram showing another example of the driving mechanism in FIGS. 2 and 3.

The objective-lens driving mechanism 11 includes an arm 12 which disposes the objective lens 5 between the stage 2 and the microscope main body 10; a first driving mechanism 13 for moving the objective lens 5, which is held by the arm 12, in the vertical direction; second and third driving mechanisms 14 and 15 for moving the objective lens 5 in two horizontal directions; and fourth and fifth driving mechanisms 16 and 17 for rotating the objective lens 5 about axes parallel to two directions orthogonal to the optical axis of the objective lens 5. The first to third driving mechanisms 13 to 15 include, for example, motors 13a to 15a and linear driving mechanisms, for example, ball screws (not shown in the drawing), connected to the motors 13a to 15a. The fourth and fifth driving mechanisms 16 and 17 include, for example, motors 16a and 17a and speed-reduction mechanisms 16b and 17b connected to the motors 16a and 17a. The speed-reduction mechanisms 16b and 17b include, for example, lead screws 16c and 17c and nuts 16d and 17d provided at a fixed side and claws 16e and 16d, provided at a moving side, for transmitting the motion of the nuts 16d and 17d, as shown in FIGS. 2 and 3, or worm gears 16f and 17f, as shown in FIG. 4.

The amount of displacement of the specimen S and the direction thereof are calculated in a control apparatus 18 by processing images acquired by the image-acquisition device 9. In addition, the control apparatus 18 outputs driving command to each of the driving mechanism 13 to 17 of the objective-lens driving mechanism 11 to drive the objective lens 5 in a direction which corrects shifting of the optical axis of the objective lens 5 due to displacement of the specimen S, and the control apparatus 18 is connected to the image-acquisition device 9.

Figure 5:
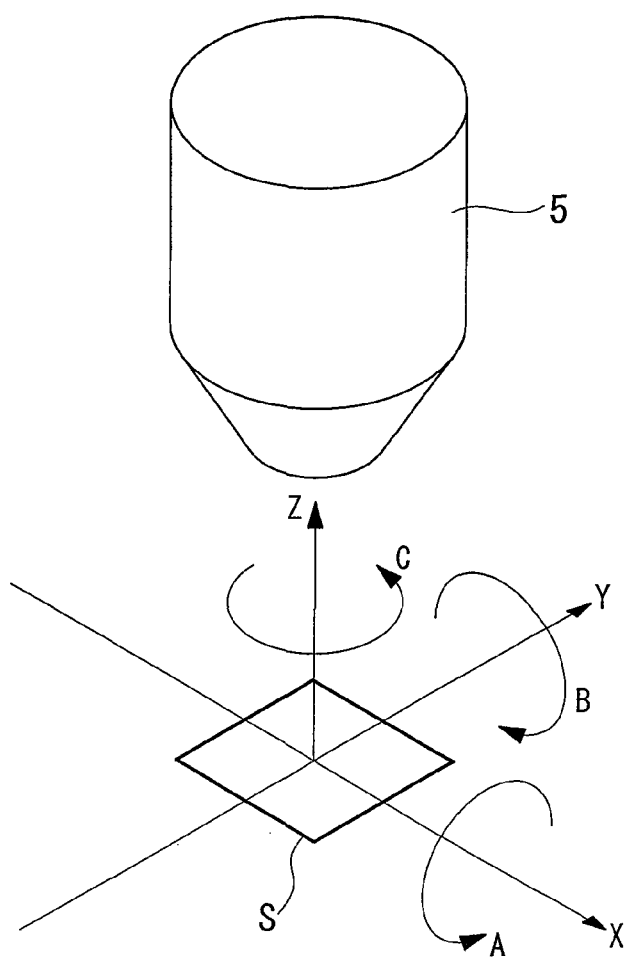
FIG. 5 is a perspective view showing the relationship between the objective lens and coordinate axes in the description of the microscope examination apparatus in FIG. 1.

As shown in FIG. 5, in the microscope examination apparatus 1 according to this embodiment, having such a configuration, by operating the objective-lens driving mechanism 11, the objective lens 5 can be moved in a Z-axis direction parallel to the optical axis and in X-axis and Y-axis directions orthogonal to the optical axis, as well in directions A and B about the X-axis and Y-axis, respectively.

Figure 6:
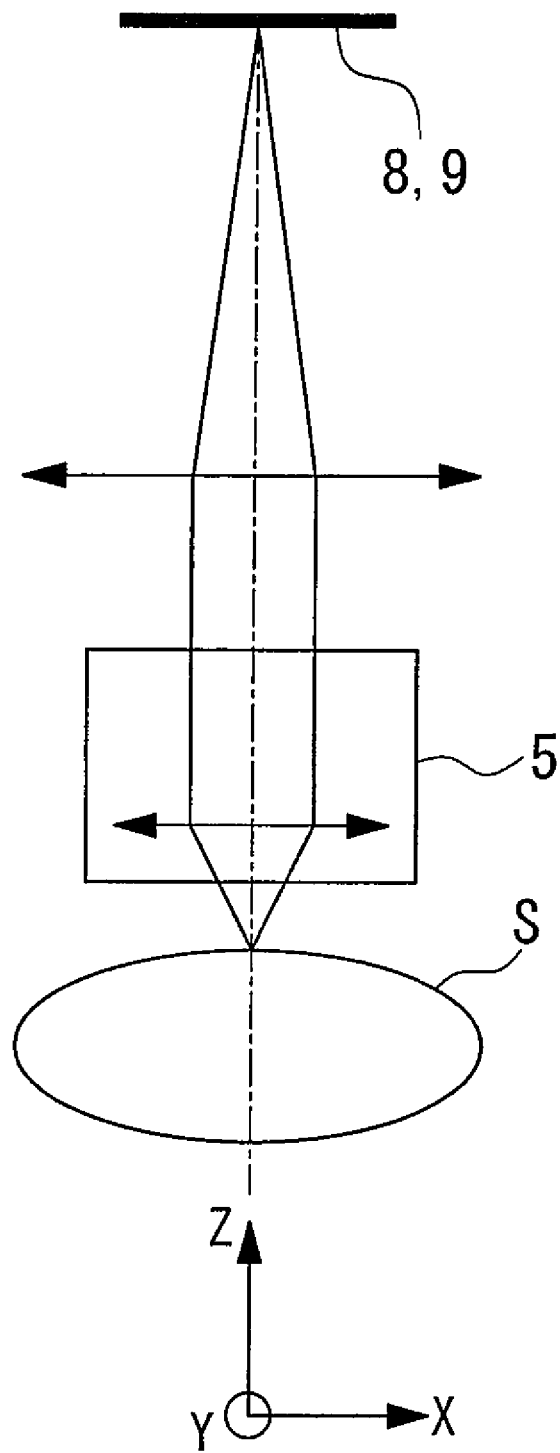
FIGS. 6 to 8 are diagrams showing the relationship between operating direction of the specimen and the operating mode of the objective lens in the microscope examination apparatus in FIG. 1.
Figure 7:
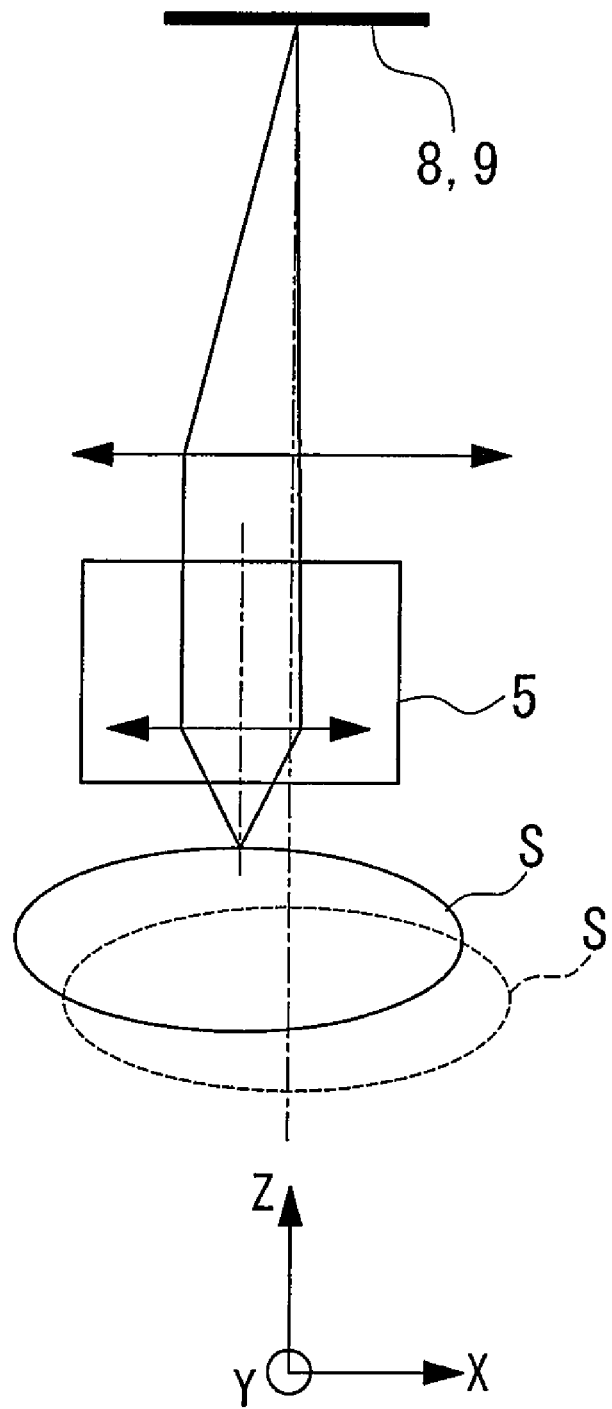
Figure 8:
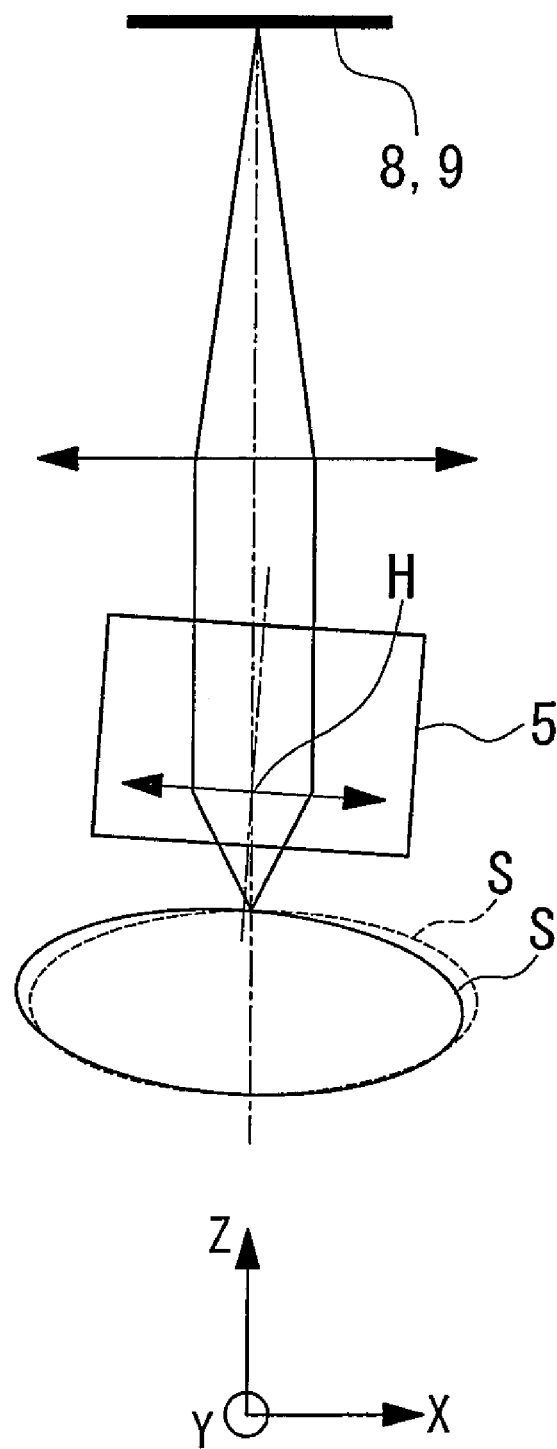

More specifically, as shown in FIGS. 6 and 7, it is possible to translate the objective lens 5 in the X-axis, Y-axis, and Z-axis directions while maintaining its orientation. Also, as shown in FIG. 8, it is possible to rotate the objective lens 5, about a principal point H, in the A and B directions about the X-axis and Y-axis.

In the following, when rotating the objective lens 5 about the principal point H at the object side thereof, a blur-correction effect and an image-blur prevention effect will be described using FIGS. 9, 10, and 19.

Figure 9:
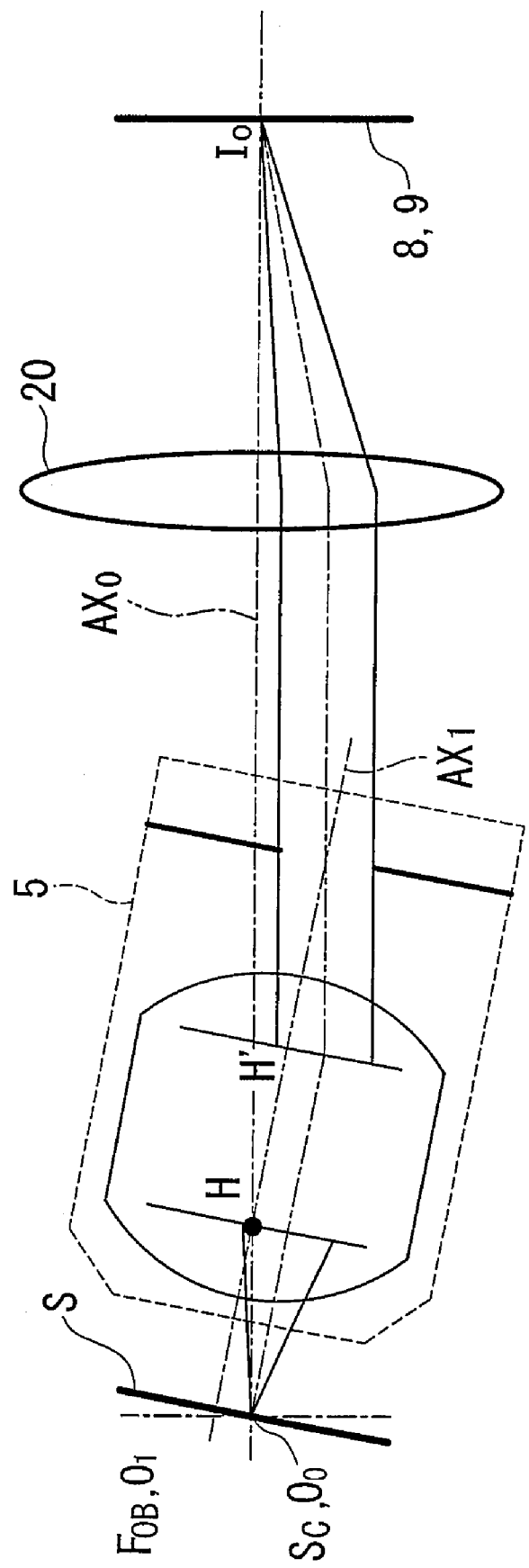
FIGS. 9 and 10 are diagrams showing the light path of the objective lens which is rotated about a principal point in the microscope examination apparatus in FIG. 1.
Figure 10:
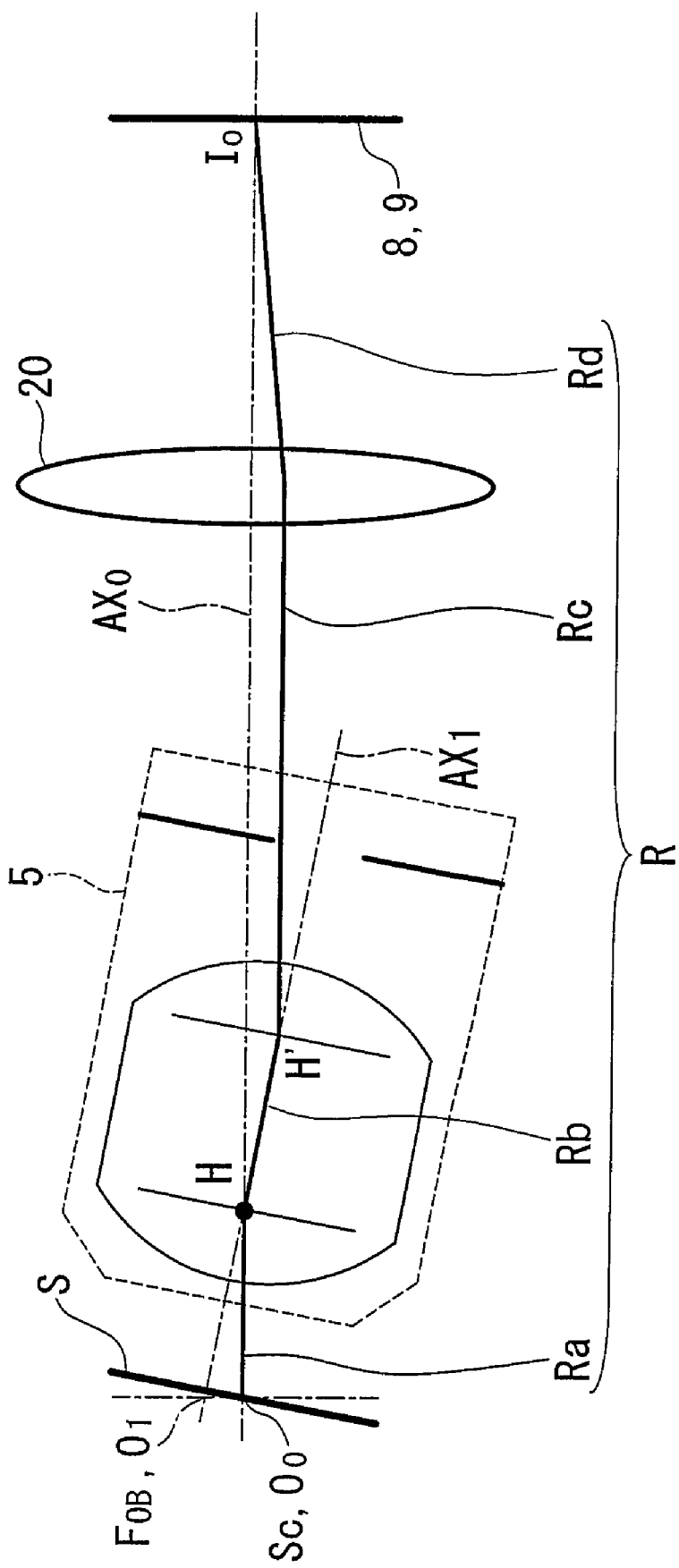
Figure 19:
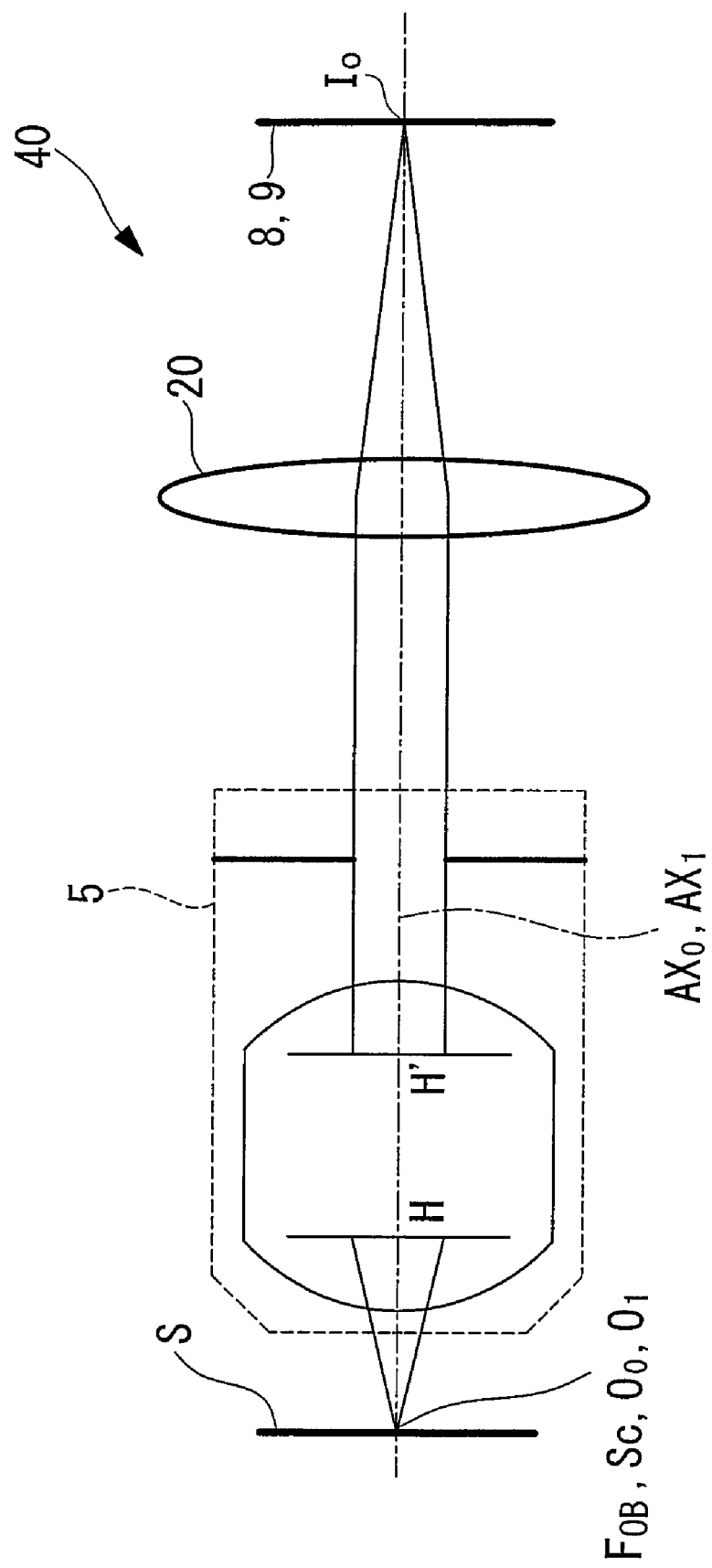
FIGS. 19 and 20 are diagrams showing the light path of the objective lens which rotated about an object point in a microscope examination apparatus according to a second embodiment of the present invention.

In FIGS. 9, 10, and 19, an optical axis $AX_0$ is the optical axis of the image-forming lenses 20; a point $O_0$ is defined as the intersection of the optical axis $AX_0$ and the specimen S; and point $I_0$ is the intersection of the optical axis $AX_0$ and the image-acquisition devices 8 and 9. An optical axis $AX_1$ is the optical axis of the objective lens 5, the point $O_1$ is the intersection of the optical axis $AX_1$ and the specimen S, and the point $F_{OB}$ is an object-side focal point of the objective lens 5. The point $S_c$ is a point on the specimen A defined as the center of the field of view.

First, as shown in FIG. 19, we consider a case in which the specimen S is orientated orthogonal to the optical axis $AX_0$, and the point Sc is at a location overlapping the optical axis $AX_0$. At this time, the orientation and position of the objective lens 5 are controlled so that the optical axis $AX_1$ thereof is aligned with the optical axis $AX_0$ and the object-side focal point $F_{OB}$ thereof overlaps the specimen S. As a result, the object-side focal plane of the objective lens 5 is aligned with the specimen S. Also, the point $O_1$, the point $O_0$, and the point Sc overlap with each other and are in conjugate relationship with a point $I_0$. In other words, in-focus images of the specimen S are projected over the entire plane at the image-acquisition devices 8 and 9, and an image of the point Sc is projected at the central point $I_0$ of the image-acquisition devices 8 and 9.

Next, as shown in FIG. 9, a case in which the specimen S is tilted at a predetermined angle about the point Sc is considered. At this time, the objective lens 5 is rotated about the object-side principal point H thereof, and the orientation is controlled so that the optical axis $AX_1$ is orthogonal to the specimen S. As a result of this orientation control, when the specimen S deviates from the object-side focal point $F_{OB}$ of the objective lens 5, the position of the objective lens 5 in the direction of optical axis $AX_0$, that is, the Z direction, is controlled so that the focal point $F_{OB}$ and the specimen S are re-aligned. As a result, the object-side focal plane of the objective lens 5 is aligned with the specimen S. At the same time, point $O_0$ and point Sc are aligned with each other, and a conjugate relationship with point $I_0$ is established. In other words, an in-focus image (that is, a blur-free image) of the specimen S is projected over the entire plane of the image-acquisition devices 8 and 9, and an image of the point $S_0$ is projected at the central point $I_0$ of the image-acquisition devices 8 and 9 (that is, blurring is prevented).

Next, when correcting the blurring by rotating the objective lens 5 about the object-side principal point H thereof, the prevention of image blur as shown in FIG. 9 will be described in detail by showing representative rays.

FIG. 10 shows, in particular, the light path of a ray R coming from the point Sc and passing through the object-side principal point H and an image-side principal point H' of the objective lens 5, in the same observation state as in FIG. 9. This ray R is formed of a ray Ra from the point Sc to the object-side principal point H, a ray Rb from the object-side principal point H to the image-side principal point H', a ray Rc from the image-side principal point H' to the image-forming lenses 20, and a ray Rd from the image-forming lenses 20 to the image-acquisition devices 8 and 9.

The ray R emitted from the point Sc propagates as ray Ra aligned with the optical axis $AX_0$ and is incident on the object-side principal point H. Then, it propagates as ray Rb aligned with the optical axis $AX_1$ and is incident on the image-side principal point H'. Then, it propagates as ray Rc parallel to the optical axis $AX_0$ and is incident on the image-forming lenses 20. Then, as ray Rd, it is deflected by the image-forming lenses 20 and is incident on the focal point of the image-forming lenses 20, that is, at the center $I_0$ of the image-acquisition devices 8 and 9.

By rotating the objective lens 5 about the object-side principal point H thereof to correct the blurring, the ray emitted from the point Sc is always incident on the point $I_0$, that is, at the center of the image-acquisition devices 8 and 9. In other words, this means that no image blurring occurs.

The operation of the microscope examination apparatus 1 according to this embodiment, having such a configuration, will be described below.

With the microscope examination apparatus 1 according to this embodiment, the excitation light E emitted from the excitation light source 3 is emitted from the microscope main body 10 via the illumination lens 4 and the dichroic mirror 6 and is incident on the objective lens 5. The excitation light E incident on the objective lens 5 passes through the objective lens 5 and irradiates the specimen S, which is mounted on the stage 2. When the excitation light E irradiates the specimen S, a fluorescent substance inside the specimen S is excited and emits fluorescence F.

The fluorescence F generated in the specimen S is collimated by the objective lens 5 to form a substantially collimated beam, which enters the microscope main body 10. The fluorescence F entering the microscope main body 10 is split off from the excitation light E by the dichroic mirror 6, is then divided by the beam splitter 7, and is detected by the individual image-acquisition devices 8 and 9.

Image information acquired by imaging with the image-acquisition device 9 is sent to the control apparatus 18, and by subjecting it to image processing in the control apparatus 18, command signals to be sent to each of the driving mechanism 13 to 17 of the objective-lens driving mechanism 11 are calculated, and each of the driving mechanisms 13 to 17 is driven on the basis of these command signals.

When the specimen S is displaced in the horizontal direction, the displacement direction and displacement amount are detected using image processing, and command signals are sent from the control apparatus 18 to the second and third driving mechanisms 14 and 15 to translate the objective lens 5 horizontally in the same direction by the same displacement amount. Accordingly, because the objective lens 5 is translated so as to track the displacement of the specimen S, it is possible to acquire an image with a low level of blur.

When the specimen S is displaced in the optical-axis direction, the amount of displacement thereof is detected using image processing, and a command signal is sent from the control apparatus 18 to the first driving mechanism 13 to translate the objective lens 5 in the optical-axis direction by the same displacement amount. Accordingly, because the objective lens 5 is translated in the optical-axis direction so as to track the displacement of the specimen S, it is possible to acquire a clear, in-focus image.

When the specimen S is tilted about a horizontal optical axis, the direction and rotation angle thereof are detected using image processing, and command signals are sent from the control apparatus 18 to the fourth and fifth driving mechanisms 16 and 17 to rotate the objective lens 5 in the same direction by the same rotation angle.

Accordingly, because the objective lens 5 is rotated so as to track the tilting of the specimen S, it is possible to acquire a clear, blur-free image.

In this case, with the microscope examination apparatus 1 according to this embodiment, because the objective lens 5 is rotated about the principal point H thereof, no blurring of the image acquired by the image-acquisition devices 8 and 9 occurs, and therefore it is not necessary to provide a separate apparatus for correcting image blur. Therefore, an advantage is provided in that it is possible to provide a simple apparatus configuration.

Thus, with the microscope examination apparatus 1 according to this embodiment, by fixing the microscope main body 10, which is relatively heavy, and translating and rotating the objective lens 5, which is relatively light, it is possible to compensate for blurring, defocus, and moving out of the field of view due to displacement of the specimen S, which allows a clear, low-blur image to be acquired. Also, it is possible to perform continuous observation without interrupting image acquisition due to moving out of the field of view.

Figure 11:
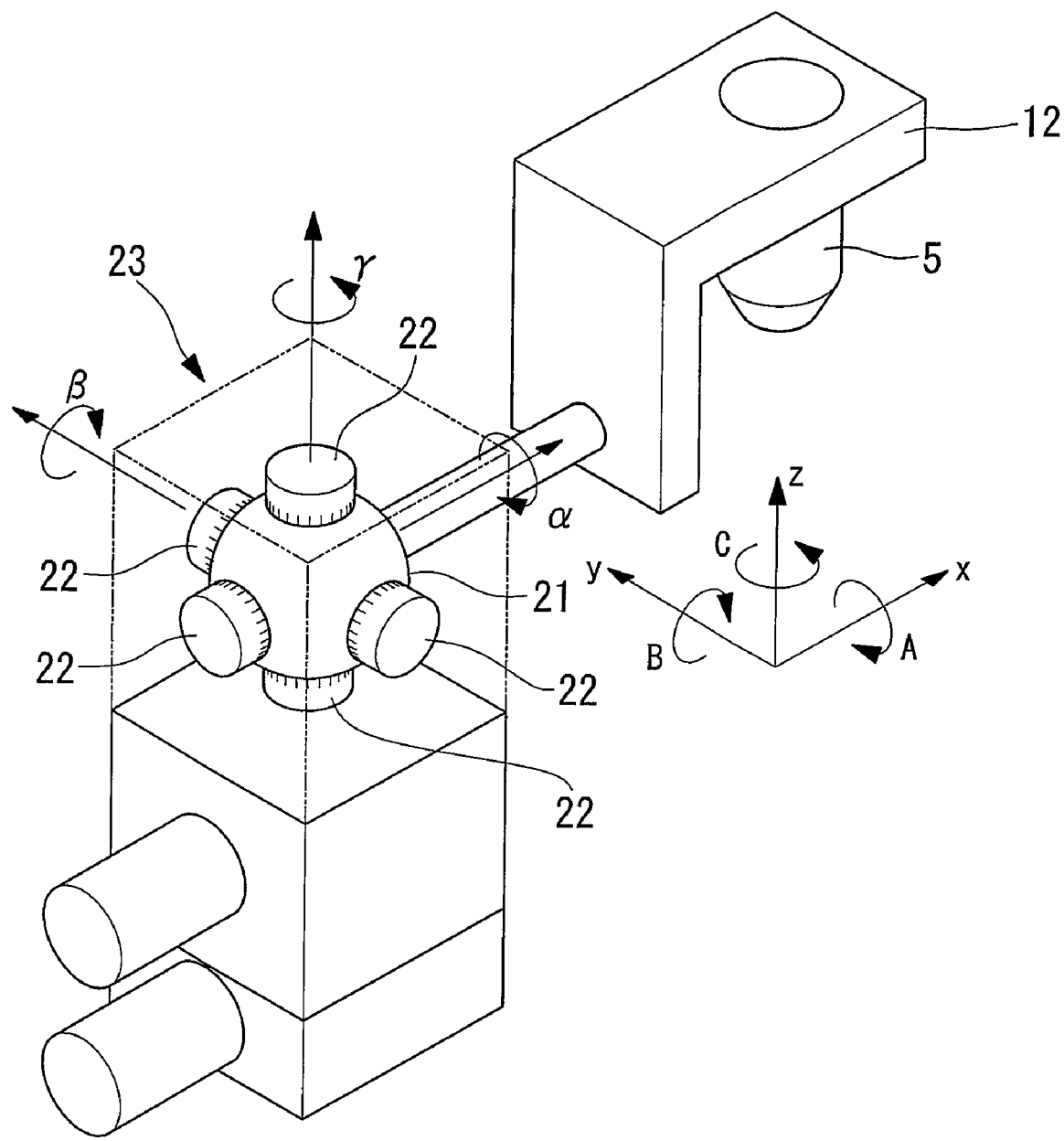
FIG. 11 is a perspective view showing a first modification of the objective-lens driving mechanism in the microscope examination apparatus in FIG. 1.

In the microscope examination apparatus 1 according to this embodiment, the lead screws 16c and 17c or the worm gears 16f and 17f are illustrated as examples of the mechanism for rotating the objective lens 5 of the objective-lens driving mechanism 11. Instead of these, however, as shown in FIG. 11, it is possible to use a multiple-degree-of-freedom spherical-surface ultrasonic motor 23 in which a plurality of ultrasonic motors 22 are arranged in contact on the circumference of a sphere 21 to which the arm 12 is attached.

Figure 12:
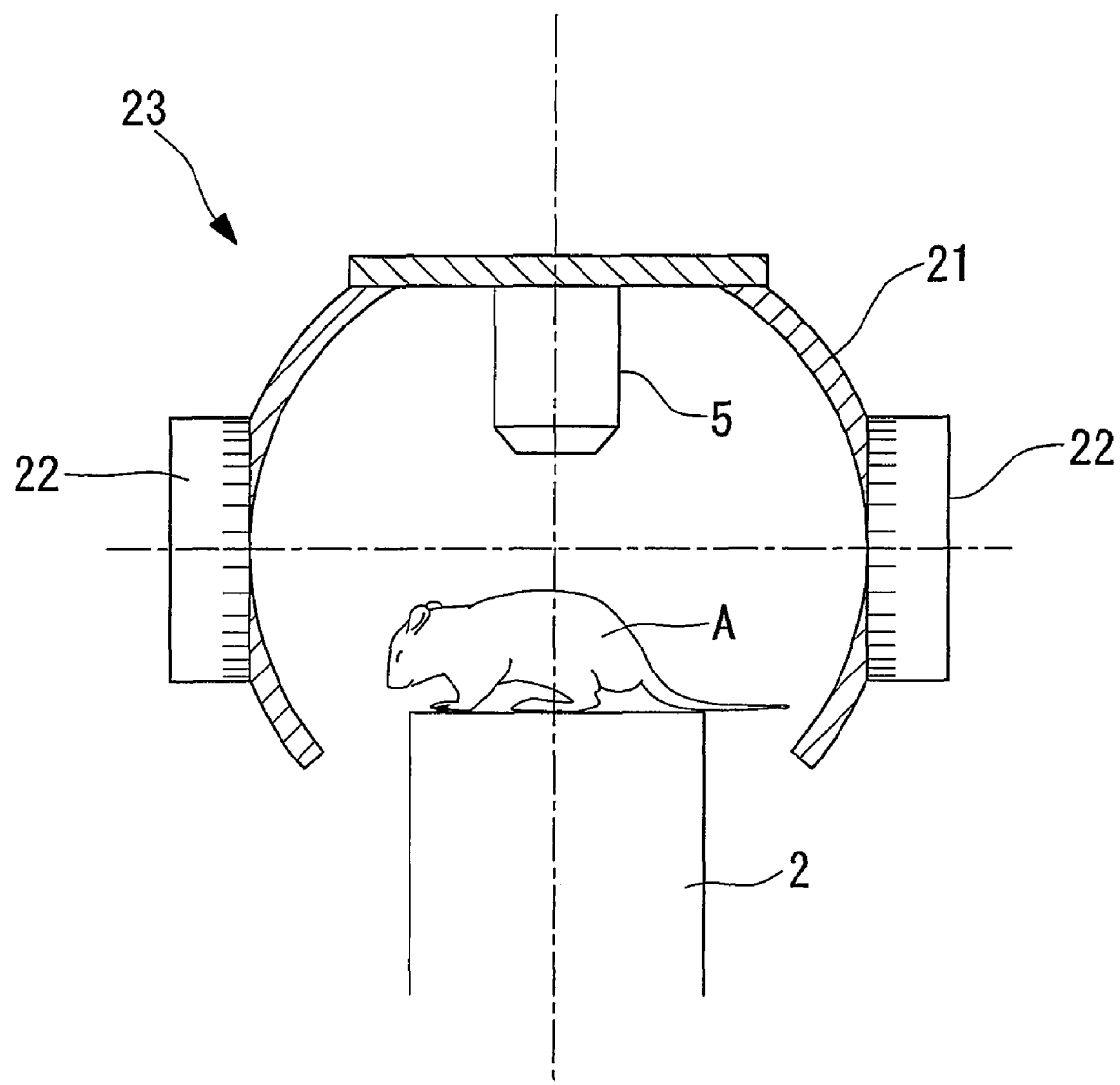
FIG. 12 is a longitudinal sectional view showing a second modification of the objective-lens driving mechanism in the microscope examination apparatus in FIG. 1.

When using the multiple-degree-of-freedom spherical-surface ultrasonic motor 23, as shown in FIG. 12, the sphere 21 may be made hollow and observation may be carried with the objective lens 5 disposed in the interior and the specimen S accommodated inside the sphere 21.

Figure 13:
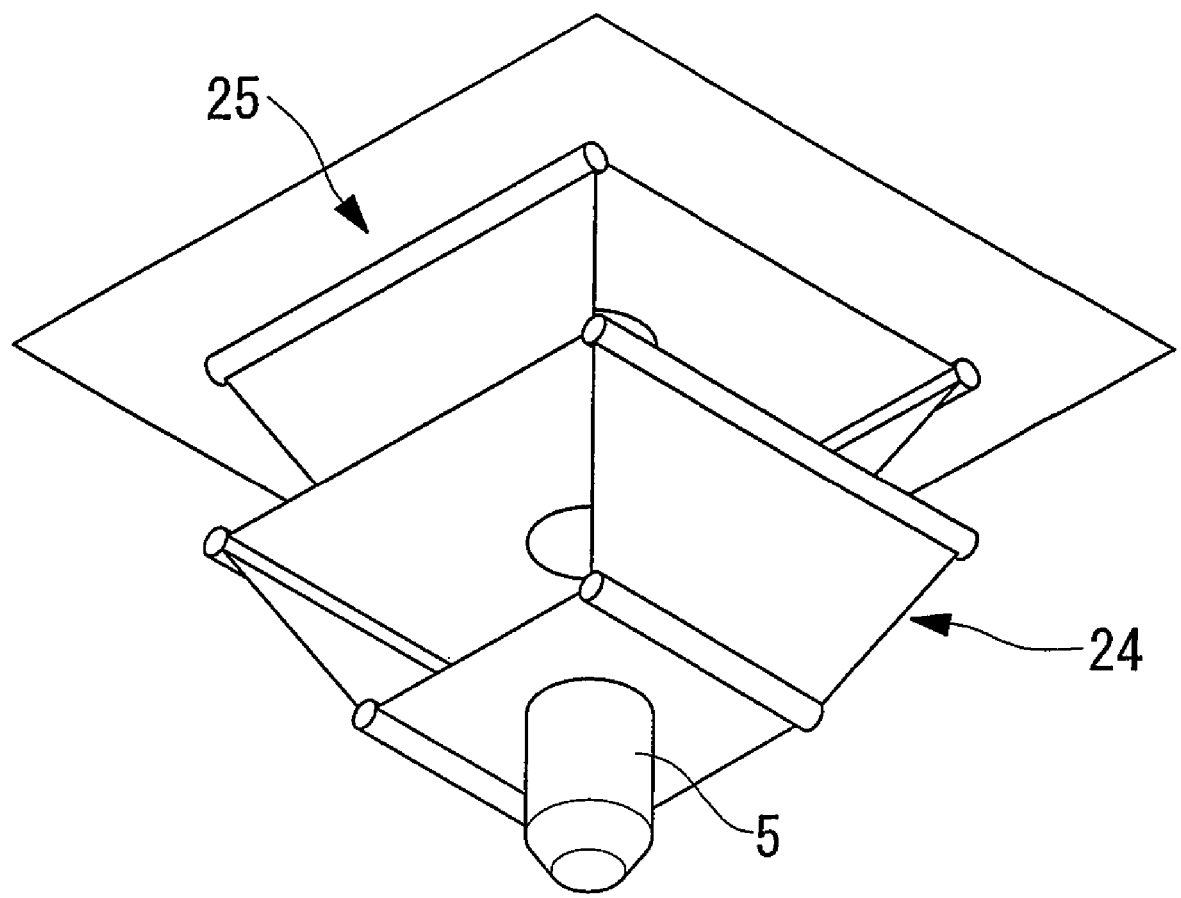
FIG. 13 is a perspective view showing a third modification of the objective-lens driving mechanism in the microscope examination apparatus in FIG. 1.

As shown in FIG. 13, it is also possible to employ two groups of platform-shaped link mechanisms 24 and 25 for rotating the objective lens 5. By rotating the platform-shaped link mechanisms 24 and 25 using actuators (not shown in the drawing) provided on the platform-shaped link mechanisms 24 and 25, it is possible to rotate the objective lens 5, which is secured to the end of the platform-shaped link mechanisms 24 and 25. The objective lens 5 is rotated about the X-axis, that is, in direction A, by the platform-shaped link mechanism 25 and is rotated about the Y-axis, that is, in direction B, by the platform-shaped link mechanism 24.

Figure 14:
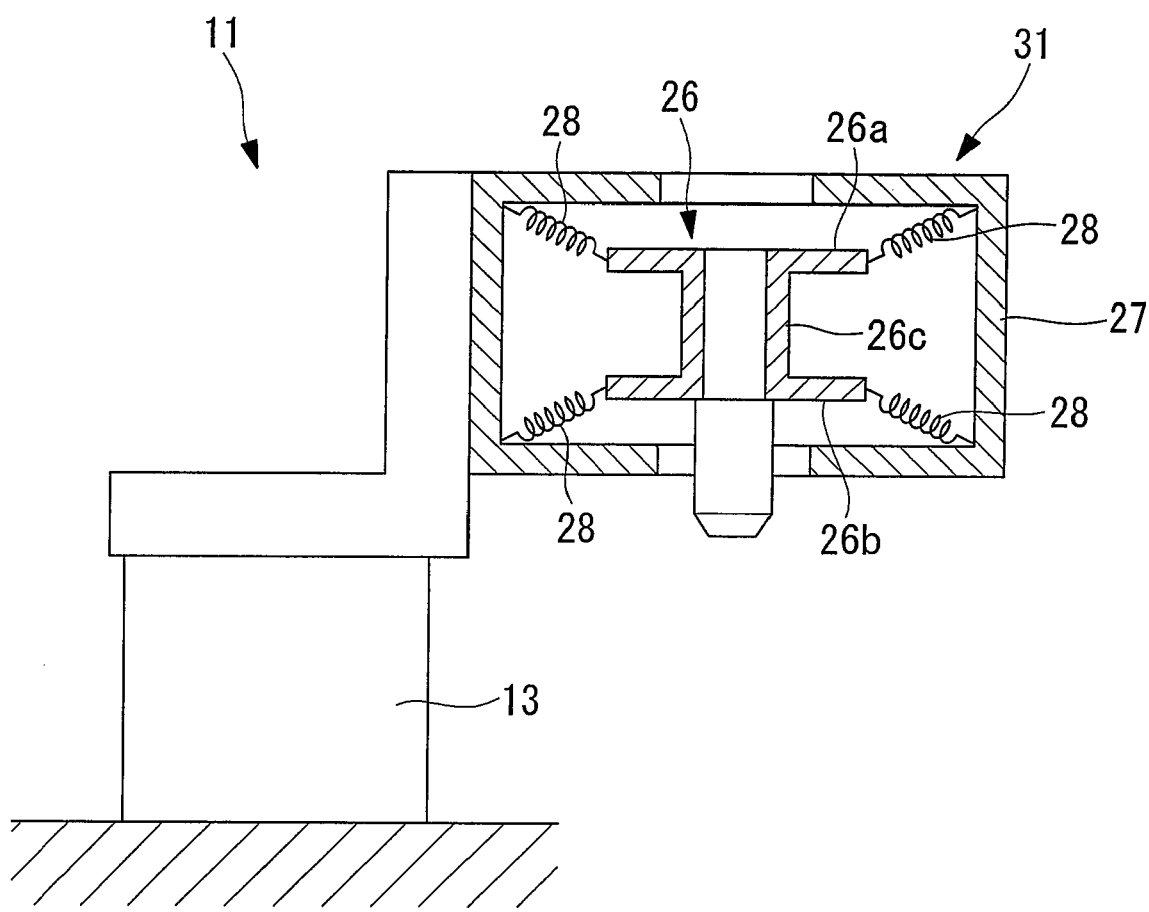
FIG. 14 is a longitudinal sectional view showing a fourth modification of the objective-lens driving mechanism in the microscope examination apparatus in FIG. 1.
Figure 15:
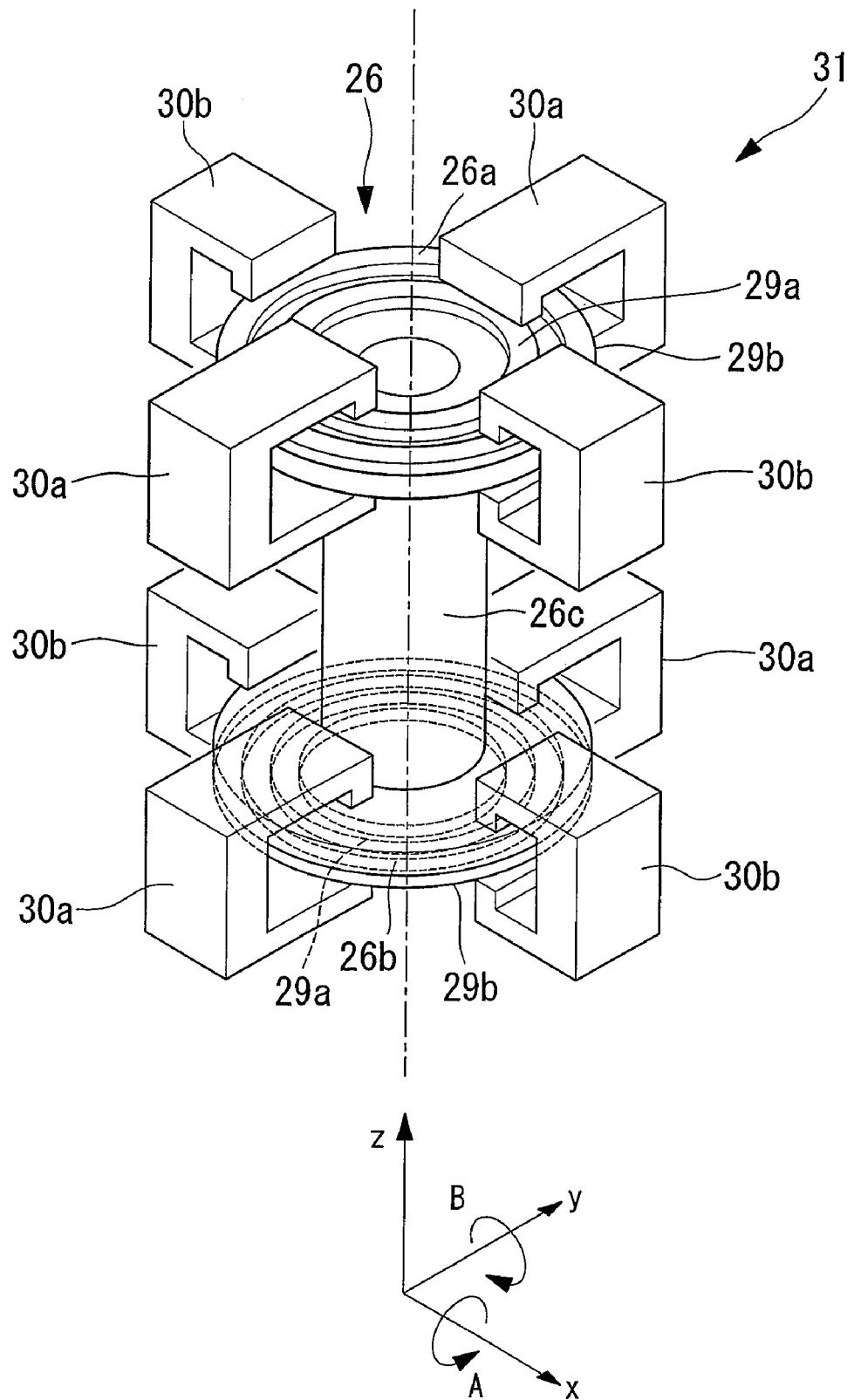
FIG. 15 is a perspective view for explaining an electromagnetic linear motor constituting the objective-lens driving mechanism in FIG. 14.

It is possible to use an electromagnetic linear motor 31 as the objective-lens driving mechanism 11. As shown in FIG. 14, a bobbin member 26, to which two pointed portions 26a and 26b are connected by means of a cylindrical portion 26c, is supported by resilient members 28, such as coil spring, so as to be capable of moving inside a case 27. In addition, as shown in FIG. 15, two inner and outer ring-shaped coils 29a and 29b are respectively disposed on each of the pointed portion 26a and 26b, and magnets 30a and 30b which sandwich each of the coils 29a and 29b are disposed at positions such that they are oriented in the radial direction of the pointed portions 26a and 26b. Translation in the optical-axis direction of the objective lens 5 is achieved by means of a Z-axis stage 13 which is provided separately from the electromagnetic linear motor 31.

Figures 16, 17:
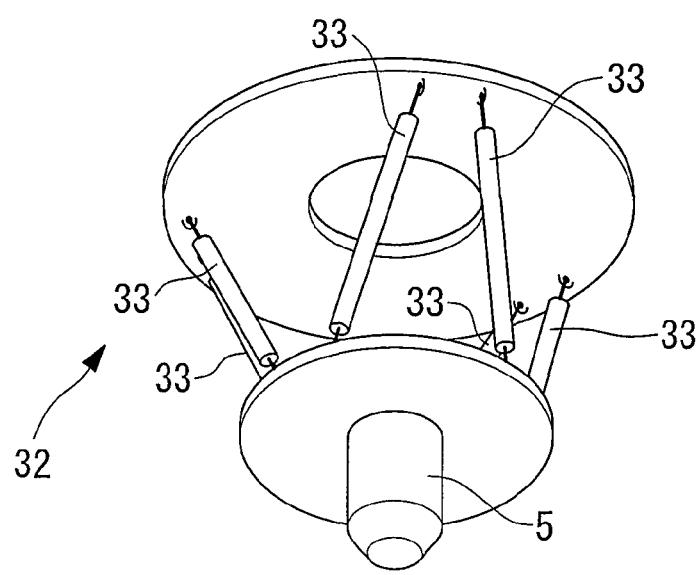
FIG. 16 shows the relationship between the operating direction of the electromagnetic linear motor in FIG. 15 and the conducting state of each coil.
FIG. 17 is a perspective view showing a fifth modification of the objective-lens driving mechanism in the microscope examination apparatus in FIG. 1.

The conducting states of the coil 29a (inner side) and the coil 29b (outer side) when translating the objective lens 5 in the X-axis and Y-axis directions and when rotating it in the A and B directions are shown in FIG. 16. For example, in order to translate the objective lens 5 in the X-axis direction, by flowing electrical currents in the same directions in the outer coils 29b on the upper and lower pointed portions 26a and 26b, using the Lorentz force between the magnets 30b and the coils 29b, a force is exerted at the same time and in the same direction in the X-axis direction on the upper and lower pointed portions 26a and 26b of the bobbin member 26, which enables the objective lens 5 to be translated. By switching the directions of the electrical currents flowing in the coils 29b, it is possible to switch the direction in which the objective lens 5 is translated in the X-axis direction. Similarly, for translation in the Y-axis direction, the inner coils 29a on the upper and lower pointed portions 26a and 26b conduct.

To rotate the objective lens 5 in the A direction about the X-axis, by flowing electrical currents in opposite directions in the inner coils 29a on the upper and lower pointed portions 26a and 26b, respectively, a force is exerted at the same time and in the opposite direction to the Y-axis direction on the upper and lower pointed portions 26a and 26b of the bobbin member 26, generating a rotational force, which enables the objective lens 5 to be rotated in the A direction. Similarly, to rotate it in the B direction about the Y-axis, electrical currents flow in opposite directions in the outer coils 29b on the upper and lower pointed portions 26a and 26b. Accordingly, it is possible to achieve translation of the objective lens 5 along the X-axis and the Y-axis and to achieve rotation thereof in the A and B directions using a single electromagnetic linear motor 31, which affords an advantage in that it is possible to construct the apparatus with a compact configuration.

In this embodiment, the objective lens 5 is separate from the microscope main body 10 and is independently controlled. However, as shown in FIG. 17, it may be attached to the microscope main body 10 using a parallel-link stage 32.

The parallel-link stage 32, which combines six linear actuators 33, can translate the objective lens 5 in the X-axis, Y-axis, and Z-axis directions and can rotate it in the A and B directions about the X-axis and Y-axis. The linear actuators 33 may use piezoelectric devices or voice coil motors. It is possible to employ linear actuators 33 of the type in which rapid expansion and contraction of piezoelectric devices is repeated (for example, see Japanese Unexamined Patent Application, Publication No. HEI 11-90867).

Figure 18:
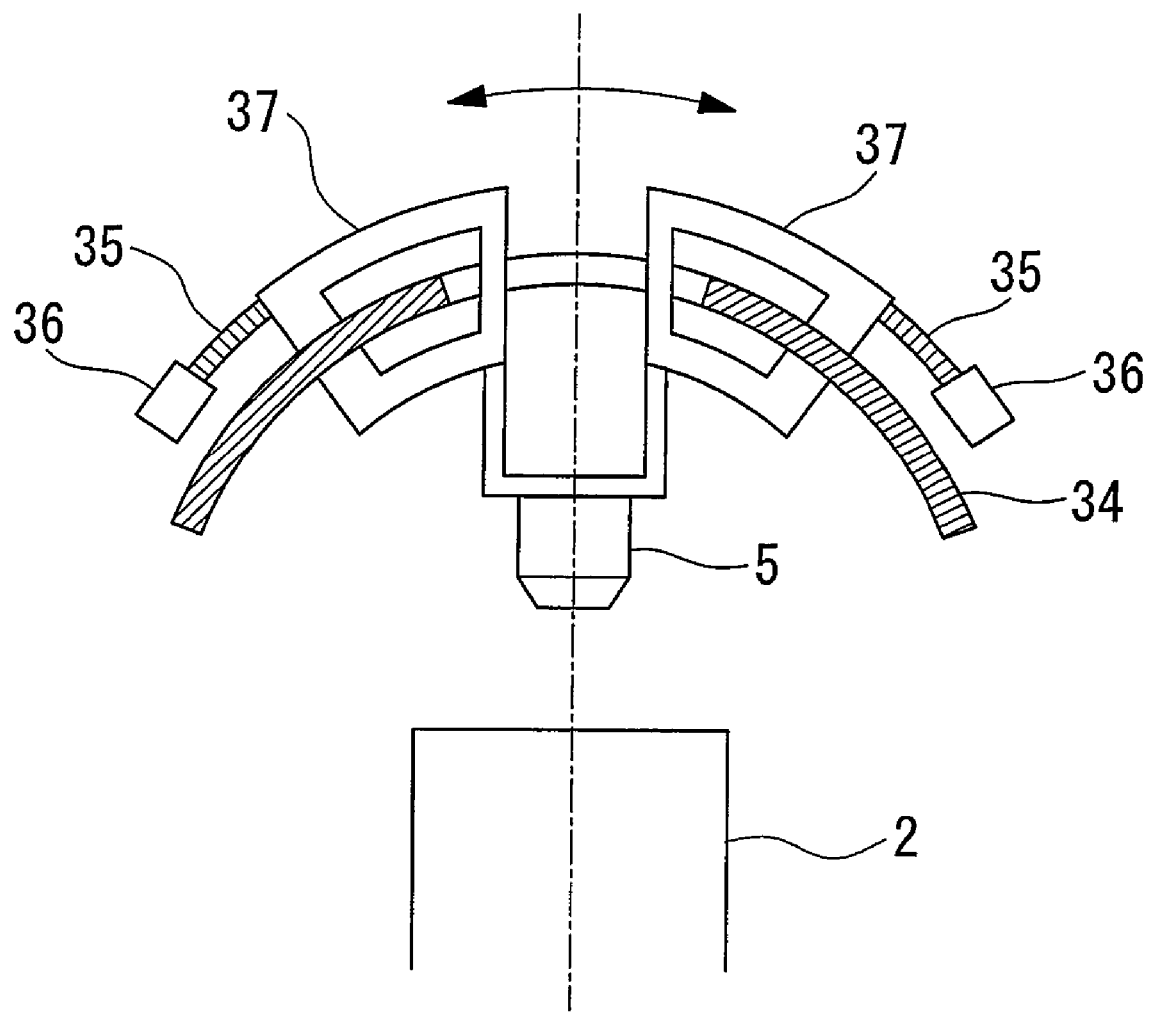
FIG. 18 is a longitudinal sectional view showing a sixth embodiment of the objective-lens driving mechanism in the microscope examination apparatus in FIG. 1.

Using this type of actuator in which rapid expansion and contraction of piezoelectric devices is repeated, as shown in FIG. 18, the objective lens 5 may be rotated along a guide rail 34 having a spherical surface. Reference numerals 35 in the drawing are piezoelectric devices, reference numerals 36 are spindles serving as inertial elements, and reference numerals 37 are sliders which are in frictional contact with the guide rail 34.

In this embodiment, as the method of detecting the amount of displacement in the optical-axis direction, the tilt direction, and the rotation angle, a method based on image processing has been described. Instead of this however, it is possible to use so-called pupil division in which a plurality of optical detectors are disposed in a plane conjugate with respect to the pupil of the image-forming optical system, and combined focus information is obtained from output signals thereof. It is also possible to dispose position detectors based on optical triangulation and to obtain surface positional information of the specimen therefrom.

Next, regarding a microscope examination apparatus 40 according to a second embodiment of the present invention, a blur-correction effect thereof and a method of correcting image blur will be described below with reference to FIGS. 19 to 22.

In the description of this embodiment, FIG. 19 is also used in the description of the microscope examination apparatus 1 according to the first embodiment described above. Also, parts having the same configuration as those in the first embodiment described above are assigned the same reference numerals, and a description thereof is thus omitted.

The microscope examination apparatus 40 according to this embodiment differs from the microscope examination apparatus 1 according to the first embodiment in that the objective lens 5 is rotated about an object-side focal point $F_{OB}$ thereof.

First, when the specimen S and the objective lens 5 are in the state shown in FIG. 19, an in-focus image of the specimen is projected over the entire plane of the image-acquisition devices 8 and 9, and an image of the point Sc is projected at central points $I_0$ of the image-acquisition devices 8 and 9.

Figure 20:
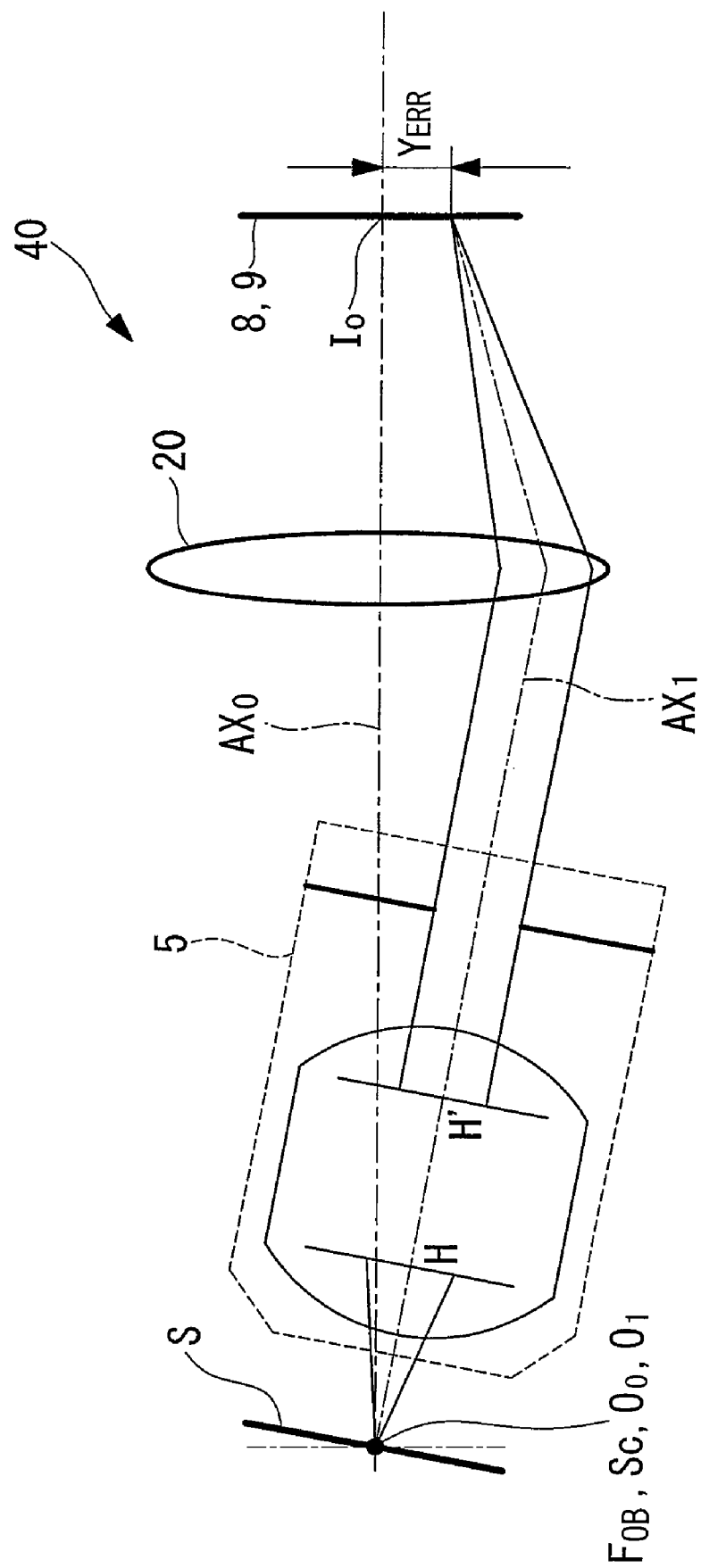

Next, as shown in FIG. 20, a case in which the specimen S is tilted at a certain angle about the point Sc is considered. At this time, the objective lens 5 is rotated about the object-side focal point $F_{OB}$ thereof, and the orientation is controlled so that the optical axis $AX_1$ is orthogonal to the specimen S. As a result, the object-side focal plane of the objective lens 5 is coincident with the specimen S. In other words, in-focus images of the specimen S (that is, images having no blur) are projected over the entire plane of the image-acquisition devices 8 and 9.

Figure 21:
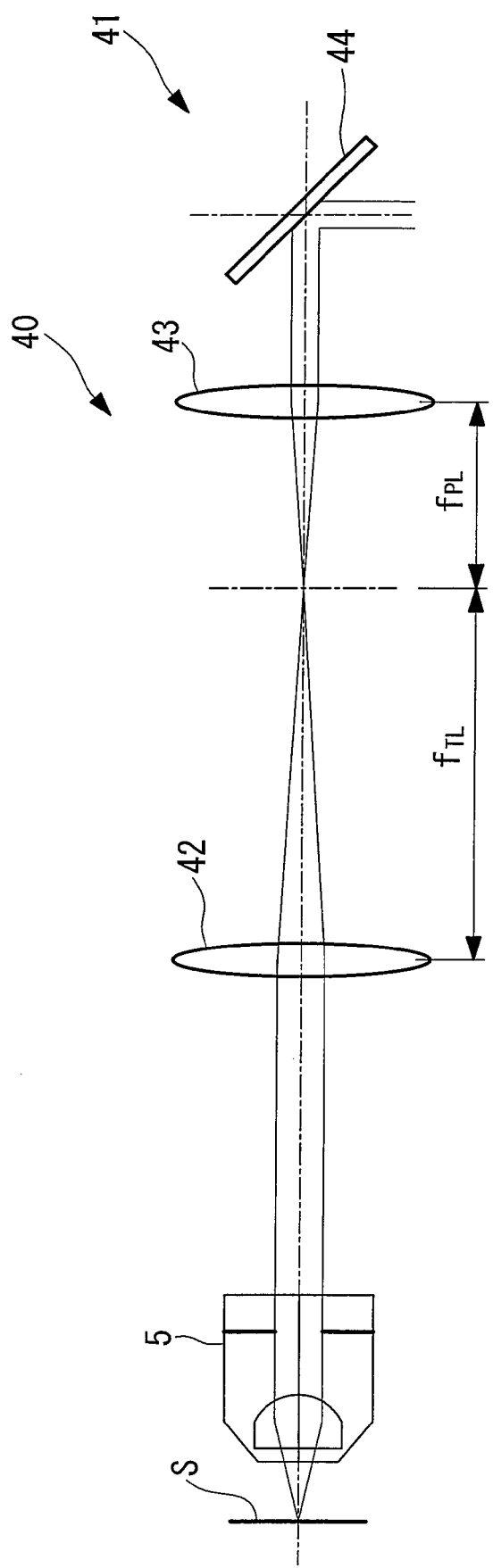
FIGS. 21 and 22 are diagrams for explaining correction of image blurring in the microscope examination apparatus in FIGS. 19 and 20.
Figure 22:
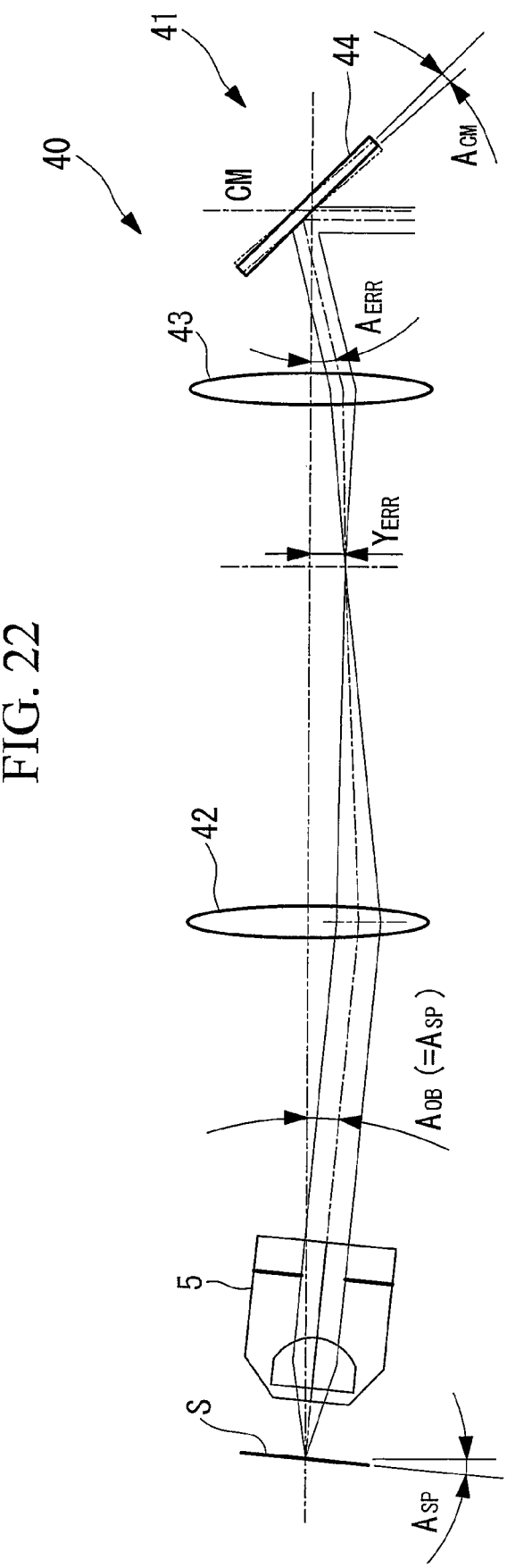

In this embodiment, however, when the objective lens 5 is rotated, so-called image blur ($Y_{ERR}$ in FIG. 20) occurs; that is, the image of the point Sc defined as the center of the field of view is shifted from the central position $I_0$ in the image-acquisition plane. Therefore, an image-blur correction mechanism 41 for correcting this is provided. As shown in FIGS. 21 and 22, the image-blur correction mechanism 41 may include an image-forming lens 42 and a pupil-relay lens 43 disposed between the objective lens 5 and the image-acquisition devices 8 and 9, and a correction mirror 44 which can be rotated may be disposed in the vicinity of the back focal point of the pupil-relay lens 43. Using the correction mirror 44 which can rotate about an axis orthogonal to the optical axis, it is possible to correct the image blur by rotating it by the following angle $A_{CM}$ in a direction opposite to the tilt direction of the objective lens.

$$A_{CM} = f_{TL}/2f_{PL} \times A_{SP} \tag{1}$$

Here, $f_{TL}$ is the focal length of the image-forming lens 42, $f_{PL}$ is the focal length of the pupil-relay lens 43, and $A_{SP}$ is the rotation angle of the objective lens 5.

Figure 23:
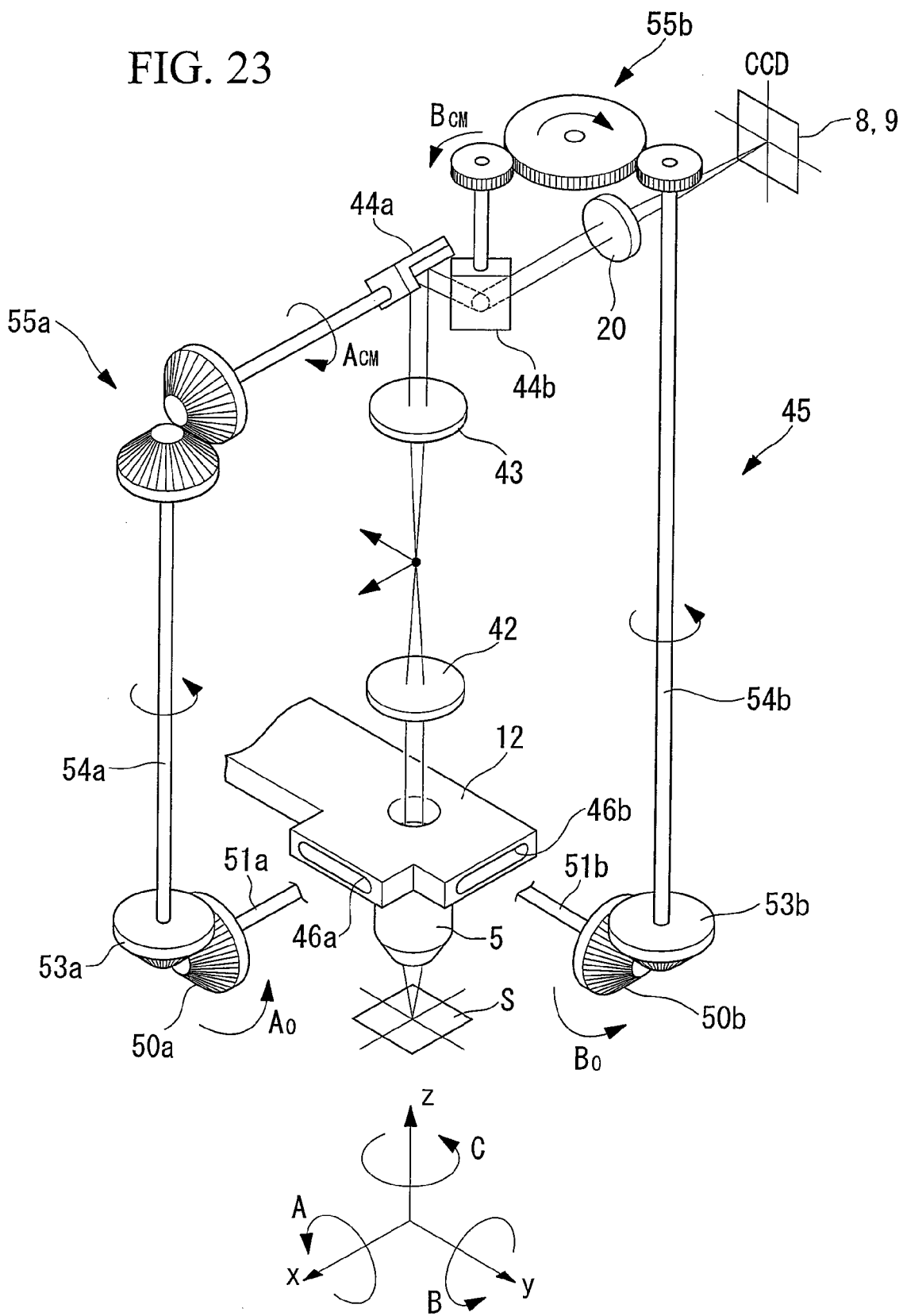
FIG. 23 is a perspective view for explaining an image-blur correction mechanism for mechanically correcting image blurring in the microscope examination apparatus in FIGS. 19 and 20.
Figure 24:
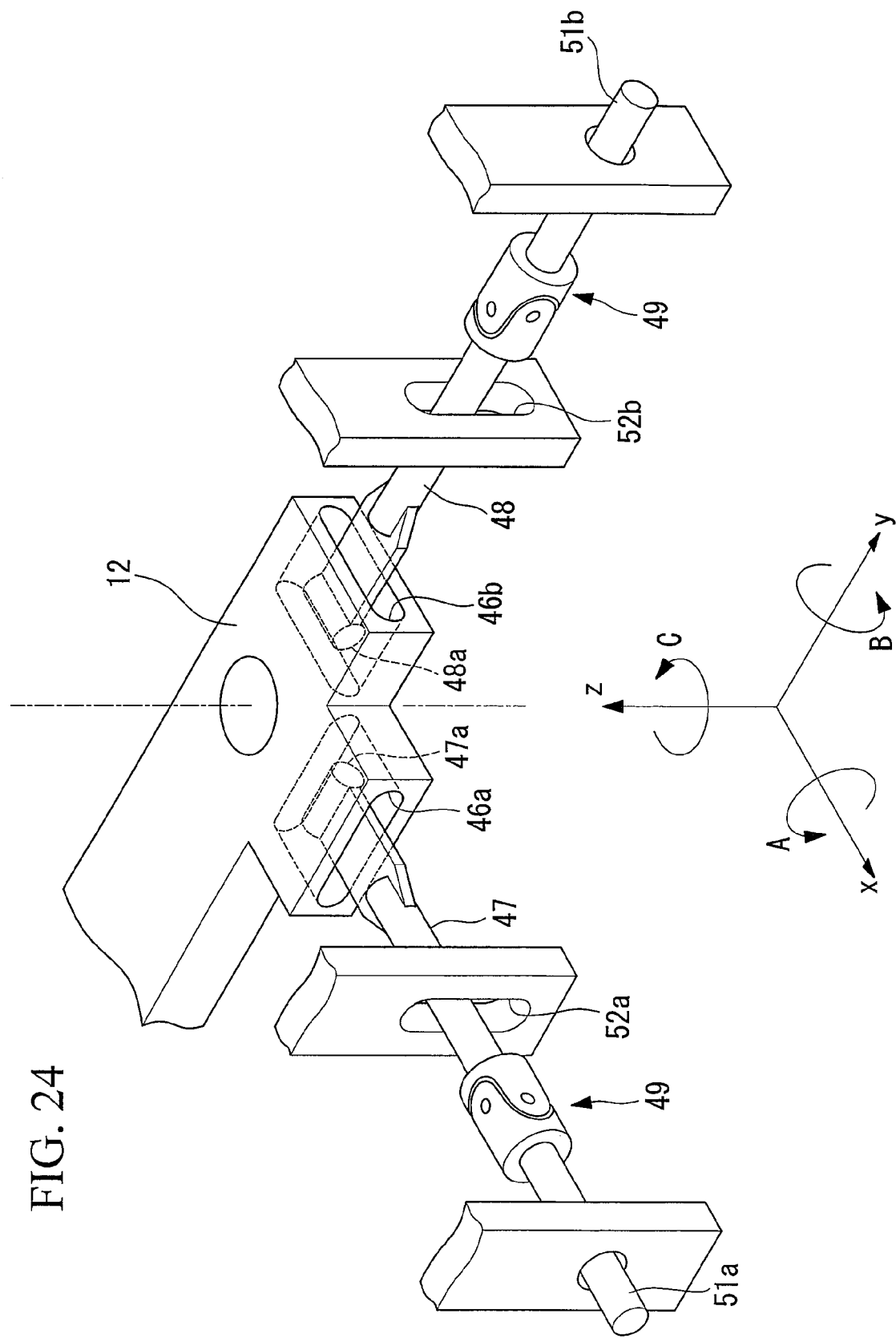
FIG. 24 is a perspective view for explaining in detail part of the image-blur correction mechanism in FIG. 23.

The correction mirror 44 may be driven using an actuator (not shown in the drawing), by operating the control apparatus 18. In addition, as shown in FIGS. 23 and 24, it may be coupled to the rotation of the objective lens 5 using a mechanical transmission mechanism 45. It may have one rotation axis to enable rotation in one direction, or it may have two rotation axes to enable free rotation in three dimensions.

Describing FIGS. 23 and 24 in more detail, one end of links 47 and 48 having columnar end portions 47a and 48a are disposed so as to be inserted inside elongated holes 46a and 46b provided in the arm 12 which holds the objective lens 5. Rotation shafts 51a and 51b of bevel gears 50a and 50b are connected to the other end of each link 47 and 48 via respective universal joints 49. Reference numerals 52a and 52b in the figure are elongated holes for restricting the movement direction of the links 47 and 48.

With this configuration, when the arm 12 is translated horizontally (in the X and Y directions), displacement of the columnar end portions 47a and 48a inside the elongated holes 46a and 46b is allowed. When the arm 12 is translated vertically (in the Z direction), the universal joints 49 bend while allowing displacement of the columnar end portions 47a and 48a inside the elongated holes 46a and 46b. Accordingly, no rotary force is transmitted to the rotation shafts of the bevel gears 50a and 50b due to the translation in the X, Y, and Z directions.

Correction mirrors 44a and 44b are respectively connected to other bevel gears 53a and 53b, which mesh with each of the bevel gears 50a and 50b, via shafts 54a and 54b and gear trains 55a and 55b.

Accordingly, when the arm 12 rotates about the X-axis, because the link 47, which extends in the X-axis direction, is made to rotate about that axis, the rotary force thereof is transmitted to the rotation shaft 51a of the bevel gear 50a, and the first correction mirror 44a is rotated via the bevel gear 53a, the shaft 54a, and the gear train 55a. At this time, no rotary force is produced on the other link 48, and the second correction mirror 44b is thus kept stationary.

Conversely, when the arm 12 rotates about the Y-axis, because the link 48, which extends in the Y-axis direction, is made to rotate about that axis, the rotary force thereof is transmitted to the rotation shaft 51b of the bevel gear 50b, and the second correction mirror 44b is made to rotate via the bevel gear 53b, the shaft 54b, and the gear train 55b. At this time, no rotary force is produced on the other link 47, and the first correction mirror 44a is thus kept stationary.

The relationship between the tilt angle of the arm 12 and the rotation angles of each of the correction mirrors 44a and 44b is set as defined by expression (1) above, by adjusting the number of teeth on the bevel gears 50a, 50b, 53a, and 53b and the gear trains 55a and 55b.

By respectively rotating the two correction mirrors 44a and 44b, it is possible to correct image blur generated according to the rotation of the objective lens 5 about the X-axis and the Y-axis.

Thus, with the microscope examination apparatus 40 according to this embodiment, because the objective lens 5 is made to rotate about the object-side focal point $F_{OB}$, although image-blur correction mechanisms 41 and 45 for correcting the image blur generated in response thereto are necessary, it is possible to observe the specimen S with the object-side focal point $F_{OB}$ of the objective lens 5, in other words, the central position of the field of view at the object side of the objective lens 5, always aligned with point Sc (that is, a point on the specimen S defined as the center of the field of view). Therefore, without deteriorating the optical characteristics of the objective lens 5, it is possible to prevent aberrations from worsening even though the objective lens 5 is rotated, which affords an advantage in that clear images can be acquired.

It has been described above that the microscope examination apparatus 40 according to this embodiment has image-acquisition devices 8 and 9 such as CCDs. Instead, however, it may include an optical scanning unit such as a galvanometer mirror for two-dimensionally scanning the excitation light E, and an optical detector such as a photomultiplier tube may be used as the optical detector. In this case, to correct the image blur by rotating the objective lens 5 about the object-side focal point $F_{OB}$, the center position of the range of rotation of the galvanometer mirror should be offset.

Regarding the timing at which images are acquired, after rotating the objective lens 5 and the correction mirrors 44, 44a, and 44b with high-speed driving actuators to move the objective lens 5 and the correction mirrors 44, 44a, and 44b to desired positions, it is preferable to perform image acquisition with these components in a stationary state in order to allow image blur to be reduced.

Because the objective lens 5 is driven based on the detected displacement of the specimen S, as the optical detector 9 for detecting the displacement of the specimen S, it is preferable to use a detector with a higher speed than the optical detector 8 for acquiring images.

In the embodiment described above, two kinds of light having different wavelengths may be emitted from the excitation light source 3; then, for example, the displacement of the specimen S may detected using the longer wavelength light, and fluoroscopy may be carried out using the shorter wavelength light. In this case, the beamsplitter 7 should be a dichroic mirror.

Regarding a method of adjusting the command signals sent to the objective-lens driving mechanism 11, in particular, when the displacement of the specimen is periodic, the objective lens 5 is continuously and periodically driven in the X, Y, Z, A, and B directions, for example, using a signal from a frequency oscillator. While the operator views the acquired images on a monitor, he or she may manually adjust the driving frequency and amplitude in each oscillation direction so as to minimize the defocus, blur, and image blur thereof.

Next, a method of securing a specimen 100 according to an embodiment of the present invention will be described with reference to FIG. 25.

Figure 25:
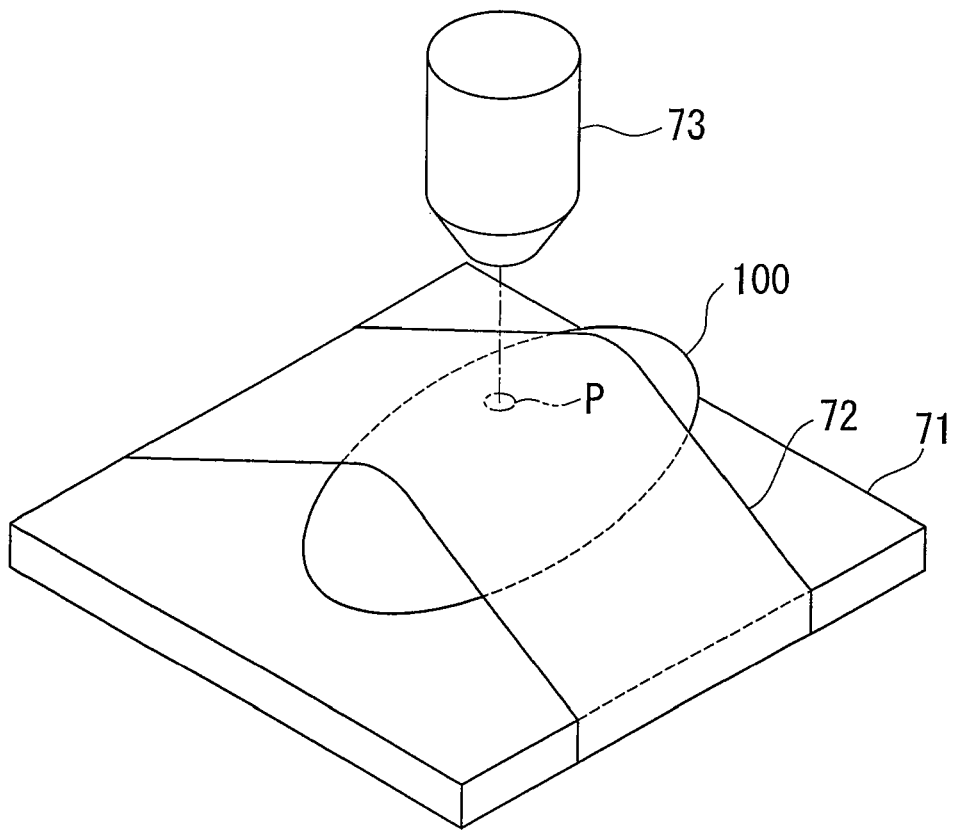
FIG. 25 is a perspective view for explaining a specimen securing method according to an embodiment of the present invention.

As shown in FIG. 25, the method of securing the specimen 100 according to this embodiment involves securing the specimen 100, such as a small laboratory animal like a mouse which is mounted on a stage 71, using a tensile force of a sheet member 72. As the sheet member 72, it is preferable to use a transparent film. After the specimen 100 is covered with the sheet member 72 and a predetermined tensile force is applied, the sheet member 72 is secured to the stage 71 using any type of securing member, for example, adhesive tape (not shown in the drawing).

With the method of securing the specimen 100 according to this embodiment, the specimen 100 is covered with the sheet member 72, formed of film, over a wide area, the entire specimen 100 is pressed by the tensile force exerted by the sheet member 72, and it is possible to press it against the stage 71. Accordingly, it is possible to reliably restrict pulsating of the specimen 100 without applying a strong pressing force locally to the specimen 100. Therefore, an excessive stress is not placed on the specimen 100, the viability of the specimen 100 is maintained during examination, and it is thus possible to carry out in vivo examination with the specimen 100 at rest.

By using the sheet member 72 formed of a transparent film, as shown in FIG. 25, it is possible to bring an objective lens 73 close to the specimen 100 to observe an examination site P thereof while leaving the sheet member 72, which suppresses pulsing of the specimen 100, interposed therebetween. Accordingly, it is possible to prevent shifting of the examination site P due to dynamic motion of the specimen 100, such as a pulse, and therefore, it is possible to acquire clear examination images in which blurring is prevented.

Figure 26:
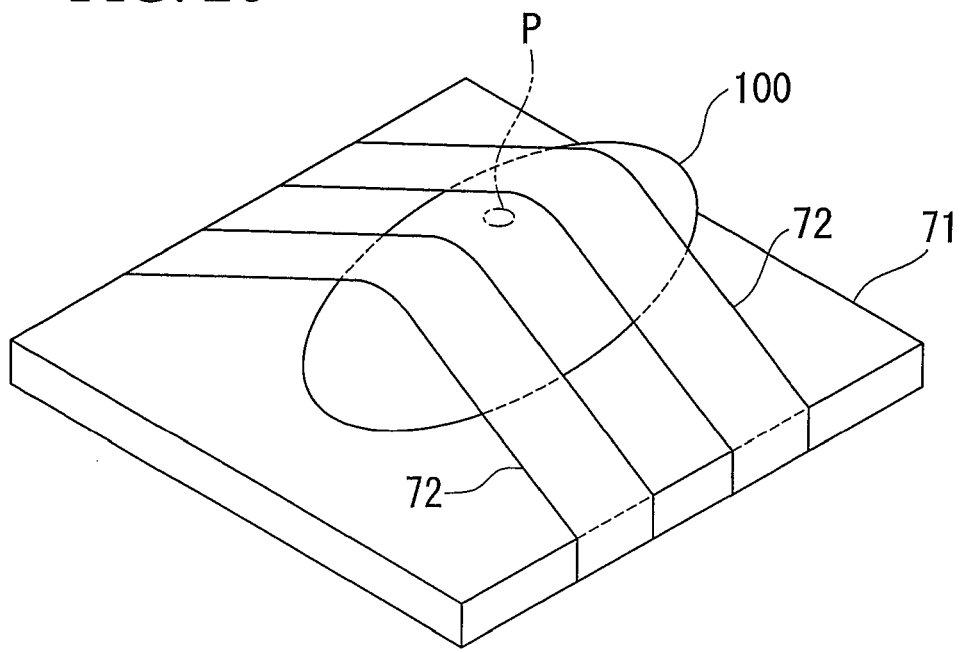
FIG. 26 is a perspective view showing a modification of the specimen securing method in FIG. 25.

In the method of securing the specimen 100 according to this embodiment, it has been describe that the specimen 100 is entirely covered with a single sheet member 72 to secure it to the stage 71. Instead of this, however, as shown in FIG. 26, the specimen 100 may be partially covered using two or more strips of sheet members 72. In this case also, because a pressing force is applied to the specimen 100 over a wide area, an excessive pressing force is prevented from being applied to the specimen 100.

Moreover, with this configuration, it is possible to expose the examination site P of the specimen 100 without covering it with the sheet member 72, and it is thus possible to acquire a clearer examination image.

Figure 27:
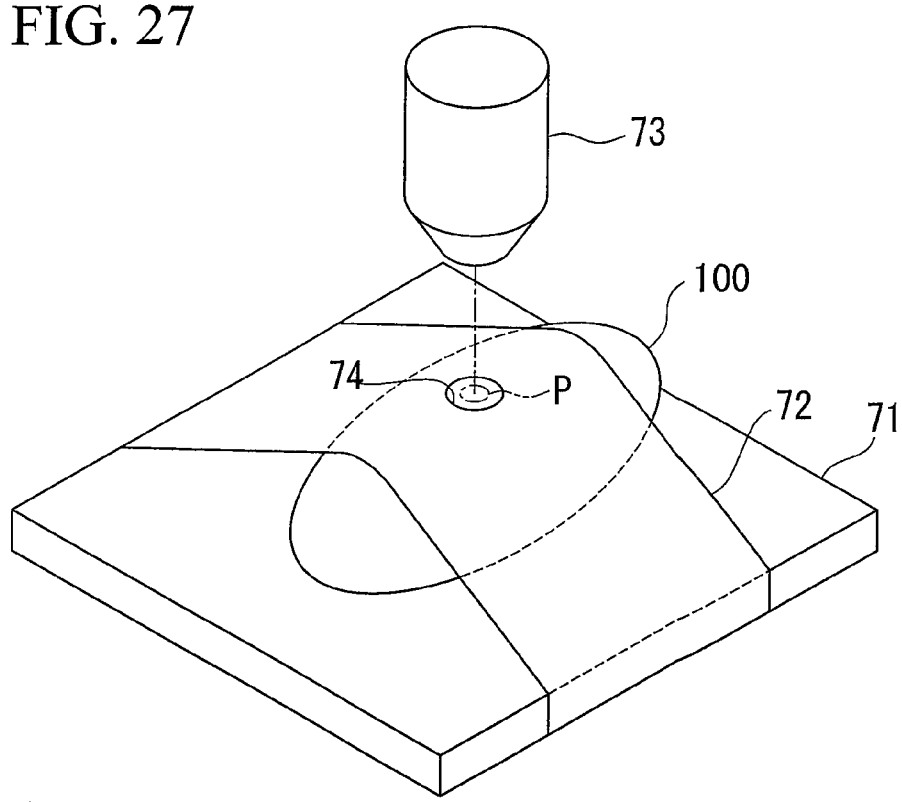
FIG. 27 is a perspective view showing another modification of the specimen securing method in FIG. 25.

In the case where the specimen 100 is secured to the stage 71 by covering the specimen 100 with a single sheet member 72 as in FIG. 25, by providing a through-hole 74 in the sheet member 72 and covering the specimen such that the through-hole 74 is aligned with the examination site P, as shown in FIG. 27, it is possible to expose the examination site P and to perform examination thereof while suppressing pulsing of the specimen 100 using the tensile force of the sheet member 72.

Thus, if it is possible to expose the examination site P in this way, the material of the sheet member 72 is not limited to a transparent material. It is possible to use a sheet member 72 made of any type of material, and therefore, it is possible to select a material having the optimum flexibility, strength, and so forth for securing the specimen 100.

Figure 28:
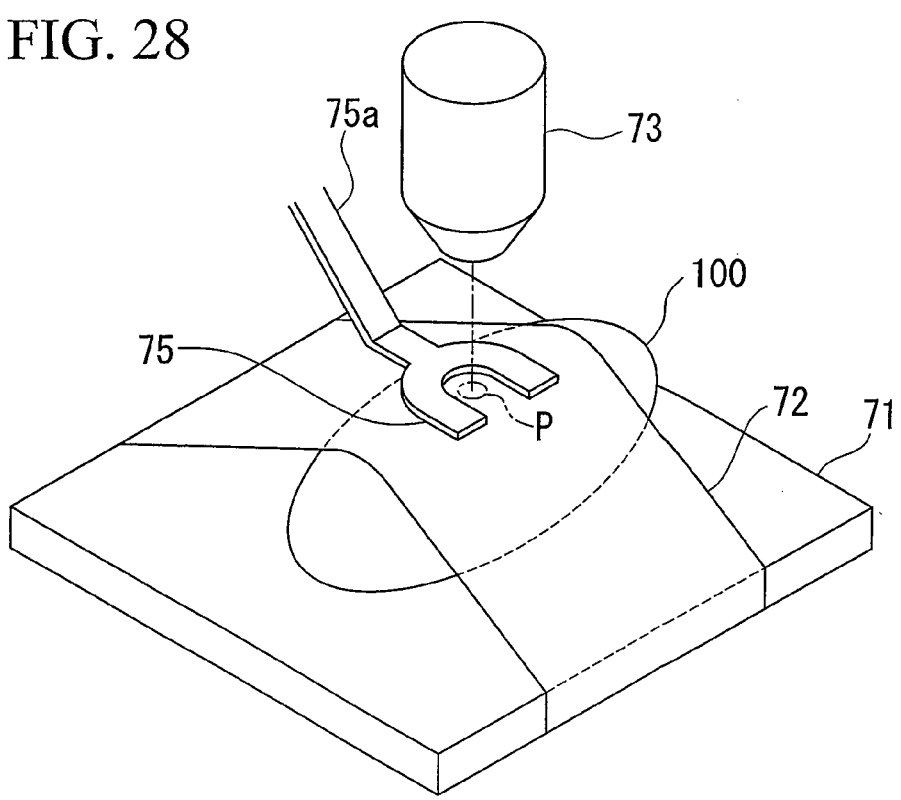
FIG. 28 is a perspective view showing yet another modification of the specimen securing method in FIG. 25.

As shown in FIG. 28, if it is not possible to suppress the pulsing using only the sheet member 72, it may be additionally suppressed using a stabilizer 75 which extends from outside of the stage 71. Two or more of the stabilizers 75 may be provided. It is also possible to provide two or more supports 75a.

Next, a securing apparatus 80, for securing the specimen 100, according to an embodiment of the present invention will be described below with reference to FIGS. 29 to 31.

Figure 29:
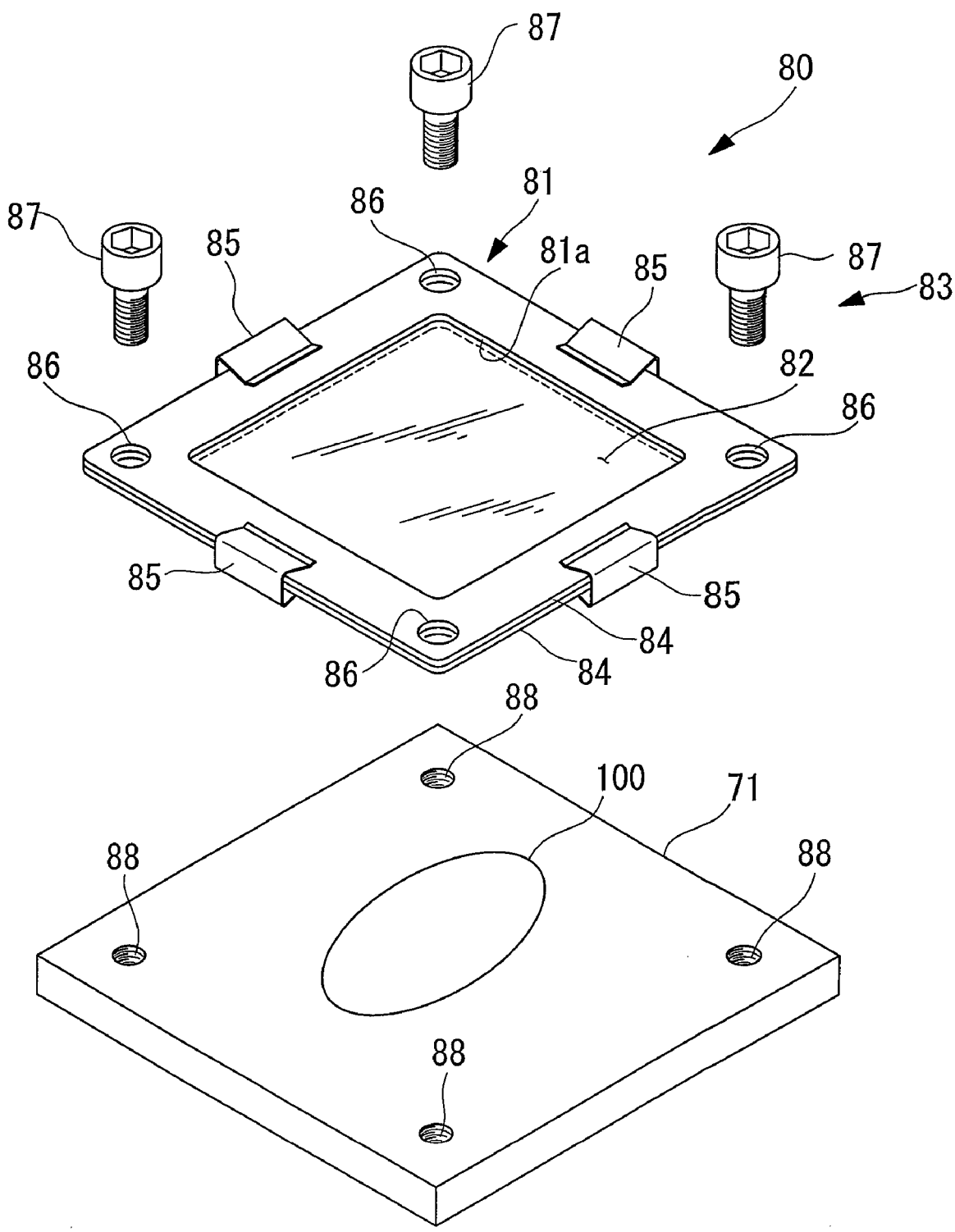
FIG. 29 is a perspective view showing a specimen securing apparatus according to an embodiment of the present invention.

As shown in FIG. 29, the securing apparatus 80 according to this embodiment includes a frame 81 having an opening 81a; a sheet member 82 which is stretched over the opening 81a in the frame 81; and a pressing portion 83 for pressing the frame 81 towards the stage 71.

Figure 31:
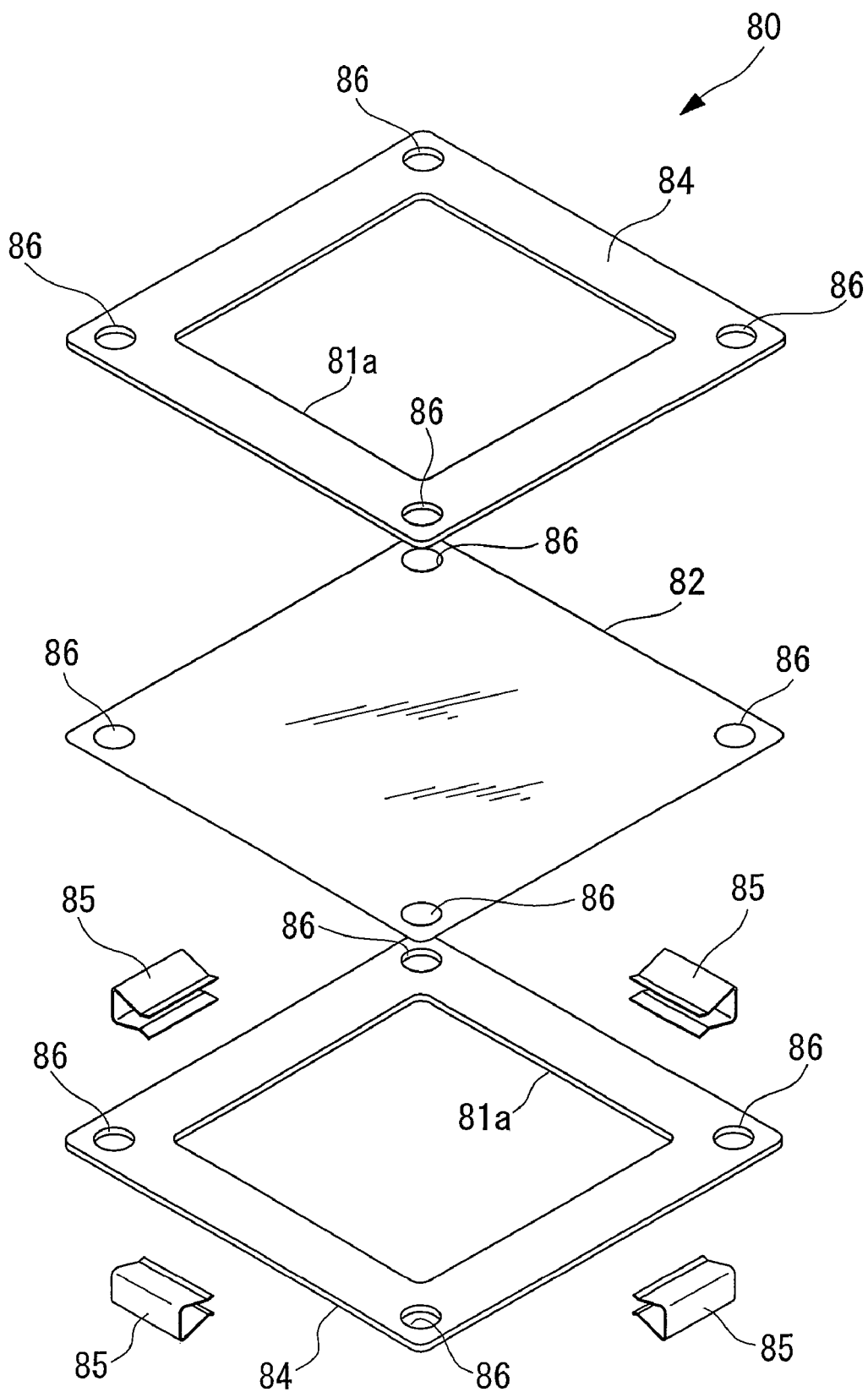
FIG. 31 is an exploded perspective view of the specimen securing apparatus in FIG. 29.

As shown in FIG. 31, the frame 81 includes a pair of frame-shaped plates 84 and clips (joining portions) 85 for keeping these frame-shaped plates 84 joined so that they are stacked together.

As shown in FIG. 29, each frame-shaped plate 84 has a substantially square outer shape and is provided, at the center thereof, with the opening 81a, which is larger than the specimen 100 mounted on the stage 71. At the peripheral parts of each frame-shaped plate 84, a plurality of through-holes 86 are provided at positions which are aligned when they are stacked together.

The clips 85 are formed of leaf spring members which sandwich the stacked frame-shaped plates 84 in the thickness direction and press the frame-shaped plates 84 to each other with a pressing force which is determined by the spring constant thereof to keep them in tight contact. In this embodiment, the clips 85 are disposed on the respective edges of the substantially square frame-shaped plates 84.

The sheet member 82 is formed, for example, of a transparent film. The sheet member 82 is sandwiched by the two frame-shaped plates 84 and is pressed by the clips 85. Therefore, the sheet member 82 is secured in the frame plates 84 so as to seal off the opening 81a.

The pressing portion 83 is formed of a plurality of bolts 87 which are inserted in the through-holes 86 provided in the frame-shaped plates 84 and threaded holes 88 which are provided in the stage 71 and with which the bolts 87 engage.

The operation of the securing apparatus 80 for securing the specimen 100 according to this embodiment, configured in this way, will be described below.

To secure the specimen 100 on the stage 71 using the securing apparatus 80 according to this embodiment, as shown in FIG. 29, the sheet member 82 attached to the frame 81 is lowered from above the specimen 100 mounted on the stage 71 and is brought into contact with the specimen 100. Then, the bolts 87 passing through the through-holes 86 in the frame-shaped plates 84 are engaged with the threaded holes 88 in the stage 71.

By gradually screwing the bolts 87 into the threaded holes 88, the frame 81 is pressed down towards the stage 71, and therefore, the tensile force of the sheet member 82 increases, and the pressing force applied to the specimen 100 increases.

Figure 30:
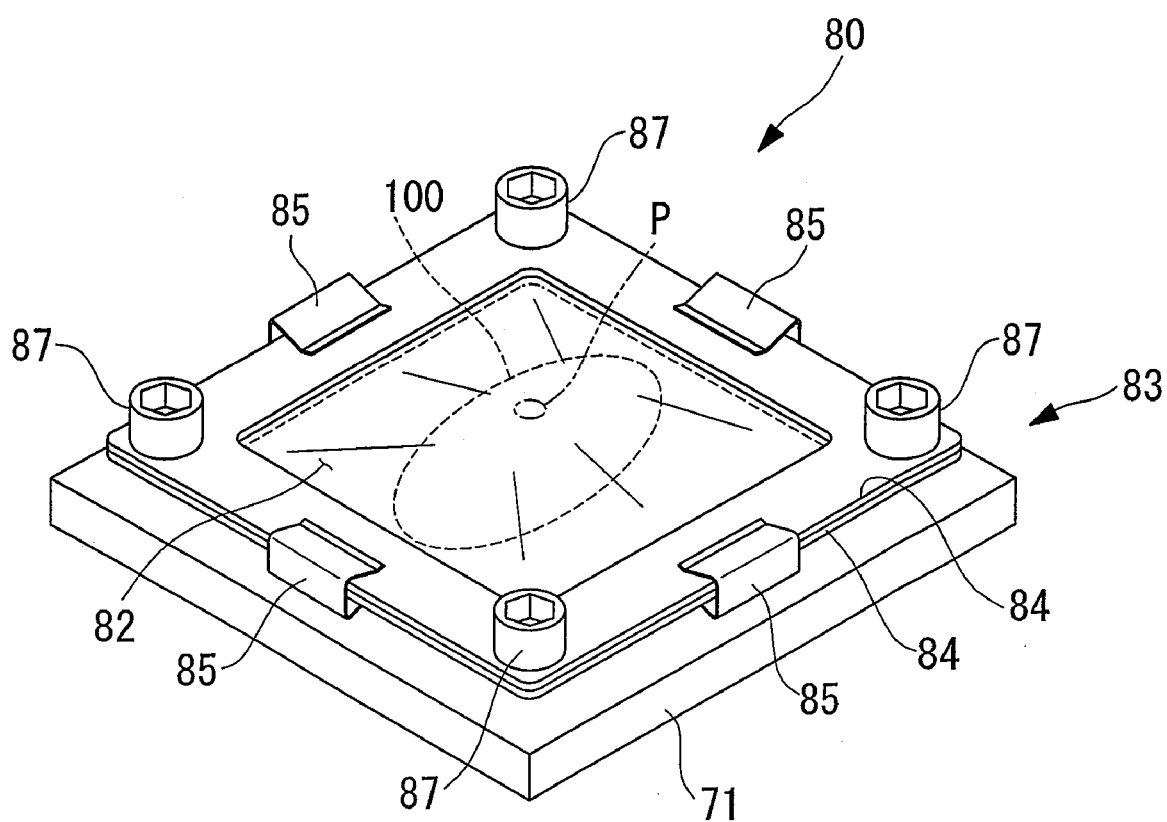
FIG. 30 is a perspective view showing a specimen secured on a stage using the specimen securing apparatus in FIG. 29.

Accordingly, as shown in FIG. 30, the specimen 100 is pressed by the sheet member 82 over a wide area, and by adjusting the fastening of the bolts 87, it is possible to adjust the tensile force applied to the sheet member 82, which allows the specimen 100 to be secured to the stage 71 with an appropriate pressing force. Therefore, the stress placed on the specimen 100 is reduced, and it is thus possible to maintain the viability of the specimen 100.

Because the sheet member 82 is formed of a transparent film, it is possible to observe the examination site of the specimen 100 while keeping the sheet member 82 interposed therebetween. Thus, with the securing apparatus 80 according to this embodiment, it is possible to prevent shifting of the examination site P due to dynamic motion of the specimen, such as a pulse, which enables the acquisition of clear examination images in which blur is prevented.

In this embodiment, by sandwiching the sheet member 82 with the pair of frame-shaped plates 84 and fastening it with the clips 85, the sheet member 82 is secured in the frame-shaped plates 84. Therefore, when changing the specimen 100 or if the sheet member 82 becomes broken, it is possible to easily replace the sheet member 82 merely by removing the clips 85.

In the securing apparatus 80 for securing the specimen 100 according to this embodiment, the frame 81 includes the pair of frame-shaped plates 84 and the clips 85 for tightly joining these frame-shaped plates 84. Instead of this however, the frame 81 may be formed of a single frame-shaped plate 84, and the sheet member 82 may be bonded to the frame-shaped plate 84.

Although a joining portion in which the pair of frame-shaped plates are joined by the clips 85 is formed, instead of this, the joining portion may be constituted by forming one of the frame-shaped plates of a magnet and forming the other one of a magnet or magnetic material. By doing so, it is possible to join both frame-shaped plates 84 by a magnetic attraction force, and it is thus possible to keep the sheet member 82 sandwiched by the joining force thereof.

A through-hole 74 similar to that shown in FIG. 27 may be provided in the sheet member 82 which is stretched in the opening 81a. Also, a plurality of strips of sheet members 72, similar to those in FIG. 26, may be stretched in the opening 81a.

Although the bolts 87 and the threaded holes 88 which are engaged with each other are used as the pressing portion, it is possible to use any other type of securing member instead.

Figure 32:
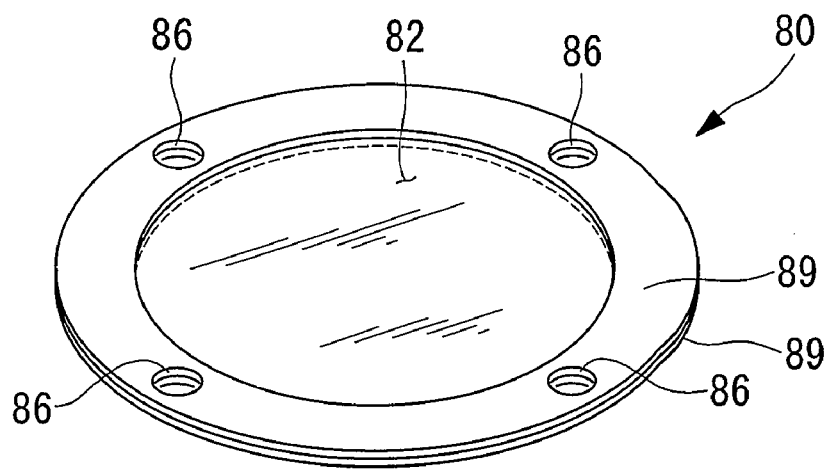
FIG. 32 is a modification of the specimen securing apparatus in FIG. 30.

The securing apparatus 80 according to this embodiment uses the substantially square frame-shaped plates 84. Instead, however, as shown in FIG. 32, it is possible to used substantially circular frame-shaped plates 89.

With this configuration, the tensile force generated in the sheet member 82 by pressing the sheet member 82 on the specimen 100 can be made substantially uniform around the entire circumference thereof. Therefore, it is possible to prevent the tensile force from concentrating locally, and the sheet member 82 can thus be prevented from breaking.

Next, a stage apparatus 90 according to an embodiment of the present invention will be described with reference to FIG. 33.

Figure 33:
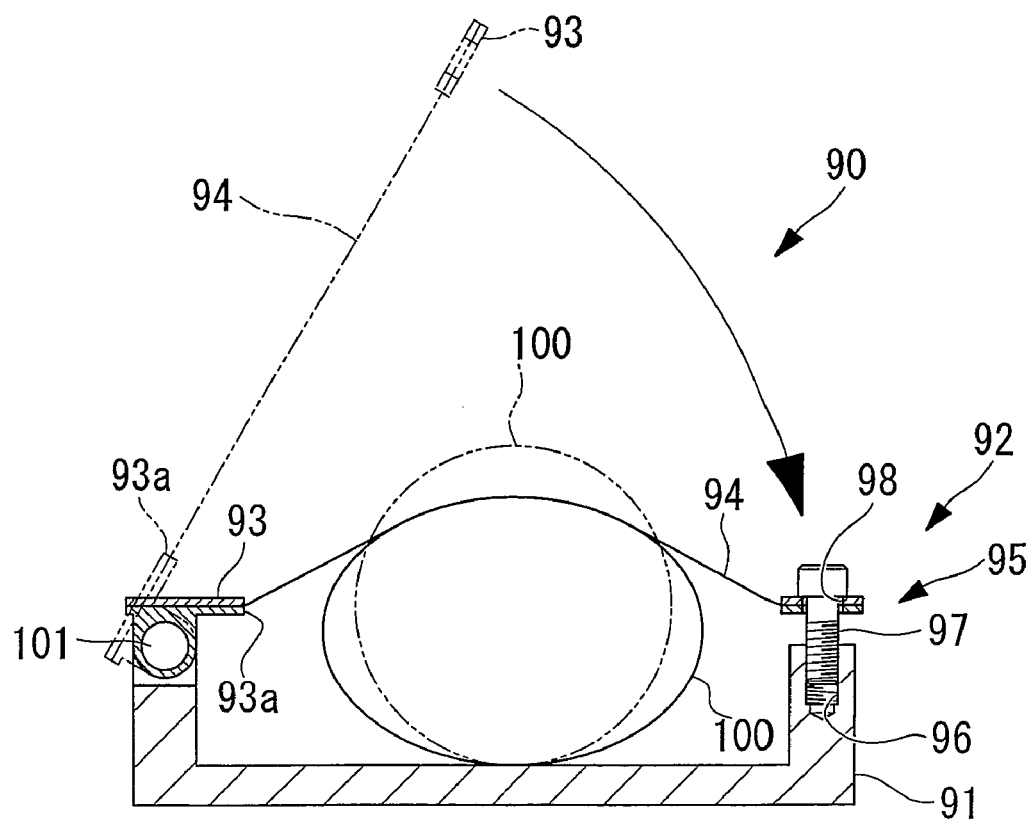
FIG. 33 is a longitudinal sectional view showing a stage apparatus according to an embodiment of the present invention.

As shown in FIG. 33, the stage apparatus 90 according to this embodiment includes a stage 91 for mounting a specimen 100, and a securing apparatus 92, provided in the stage 91, for securing the specimen 100.

The securing apparatus 92 includes a frame 93 provided so as to be capable of rotating about a horizontal shaft 101 provided in the stage 91; a sheet member 94 which is stretched so as to seal off an opening 93a in the frame 93; and a pressing portion 95 for securing the frame 93 while the specimen 100 is pressed by the sheet member 94. Similarly to FIG. 29, the pressing portion 95 includes threaded holes 96 provided in the stage 91 and bolts 97 which are engaged with the threaded holes 96.

With the stage apparatus 90 according to this embodiment, by mounting the specimen 100 on the stage 91, rotating the frame 93 in which the sheet member 94 is stretched from a position indicated by the broken line in FIG. 33 to a position indicated by the solid line, and engaging the bolts 97 inserted in the through-holes 98 provided in the frame 93 with the threaded holes 96 in the stage 91, the specimen 100 can be secured to the stage 91 by a tensile force produced in the sheet member 94. By doing so, the number of bolts to be engaged can be reduced, and it is possible to more easily secure the specimen 100 to the stage 91.

The specimen S and the specimen 100 according to the above embodiment may include small laboratory animals such as mice and rats.

Additional Items

Aspects of the invention according to the following configurations are derived from the embodiments described above.

What is claimed is:

1. A microscope examination apparatus for observing a specimen of a living organism comprising:
    a first image-acquisition device configured to image the specimen of the living organism;
    a second image-acquisition device configured to image the specimen of the living organism, the second image-acquisition device having a higher speed of acquiring images than the first image-acquisition device; and
    a control apparatus configured to calculate a command signal to correct image blur caused by dynamic behavior of the specimen whose image has been acquired by the first image-acquisition device, based on a result of image processing of an image which has been acquired by the second image-acquisition device with a higher speed than acquiring the image by the first image-acquisition device.

2. The microscope examination apparatus according to claim 1, wherein the command signal is calculated on the basis of displacement direction or displacement amount of the dynamic behavior.

3. The microscope examination apparatus according to claim 1, wherein the command signal is calculated to correct image blur of the image acquired from a living organism which exhibits the dynamic behavior due to a movement within a short period of time.

4. The microscope examination apparatus according to claim 1, wherein the command signal is calculated to correct image blur of the image acquired from a living organism which exhibits the dynamic behavior due to a movement caused by a pulse or respiration of the living organism.

5. The microscope examination apparatus according to claim 1, further comprising;
    an objective lens configured to image the specimen of the living organism;
    a driving apparatus configured to drive the objective lens in a direction correcting image blur.

6. The microscope examination apparatus according to claim 5, further comprising;
    an objective lens configured to image the specimen of the living organism;
    a dividing apparatus configured to divide a light which is incident on the objective lens into a light which is incident on the first image-acquisition device and a light which is incident on the second image-acquisition device.

7. The microscope examination apparatus according to claim 1, wherein the second image-acquisition device acquires the image repeatedly at the timing after an image blur is corrected by the command signal.

8. The microscope examination apparatus according to claim 1, further comprising:
    a microscope main body including the first image-acquisition device and the second image-acquisition device; and
    an objective-lens driving mechanism supporting an objective lens configured to image the specimen of the living organism and to be separated from the microscope main body.

9. The microscope examination apparatus according to claim 8, wherein the objective-lens driving mechanism is driven on the basis of the command signal.

10. The microscope examination apparatus according to claim 1, wherein a wavelength in which an image is acquired by the first image-acquisition device is different from a wavelength in which an image is acquired by the second image-acquisition device.

11. A microscope examination apparatus for observing a specimen of a living organism comprising:

a first image-acquisition means for imaging the specimen of the living organism;

a second image-acquisition means for imaging the specimen of the living organism, the second image-acquisition means having a higher speed of acquiring images than the first image-acquisition means; and a control means for calculating a command signal to correct image blur caused by dynamic behavior of the specimen whose image has been acquired by the first image-acquisition means, based on a result of image processing of an image which has been acquired by the second image-acquisition means with a higher speed than acquiring the image by the first image-acquisition means.

* * * * *